US012368231B2

(12) United States Patent
Li et al.

(10) Patent No.: US 12,368,231 B2
(45) Date of Patent: Jul. 22, 2025

(54) ELECTRONIC DEVICE FOR MIMO ANTENNA

(71) Applicant: Huawei Technologies Co., Ltd., Shenzhen (CN)

(72) Inventors: Yuanpeng Li, Shenzhen (CN); Hanyang Wang, Reading (GB); Dawei Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 18/259,909

(22) PCT Filed: Dec. 22, 2021

(86) PCT No.: PCT/CN2021/140289
§ 371 (c)(1),
(2) Date: Jun. 29, 2023

(87) PCT Pub. No.: WO2022/143320
PCT Pub. Date: Jul. 7, 2022

(65) Prior Publication Data

US 2024/0088541 A1 Mar. 14, 2024

(30) Foreign Application Priority Data

Dec. 30, 2020 (CN) ......................... 202011611722.2
Mar. 19, 2021 (CN) ......................... 202110296431.7

(51) Int. Cl.

| | |
|---|---|
| ***H01Q 1/24*** | (2006.01) |
| ***H01Q 5/321*** | (2015.01) |
| ***H01Q 5/335*** | (2015.01) |

(52) U.S. Cl.
CPC ............. *H01Q 1/243* (2013.01); *H01Q 5/321* (2015.01); *H01Q 5/335* (2015.01)

(58) Field of Classification Search
CPC ......... H01Q 1/243; H01Q 5/321; H01Q 5/335
See application file for complete search history.

(56) References Cited

U.S. PATENT DOCUMENTS

2007/0024514 A1 2/2007 Phillips et al.

FOREIGN PATENT DOCUMENTS

CN 110137681 A 8/2019
CN 113764885 A 12/2021

OTHER PUBLICATIONS

Li Si et al, "One Method to Realize Decoupled Antenna Pair for 5G MIMO Mobile Phone", 2020 International Workshop on Antenna Technology (iWAT), 3 pages.

*Primary Examiner* — Monica C King
(74) *Attorney, Agent, or Firm* — Conley Rose, P.C.

(57) ABSTRACT

An electronic device includes an antenna structure having an antenna radiator, a first circuit, a first feeding element, and a second feeding element. The first circuit comprises feeding input ports configured to input electrical signals of the first feeding element and the second feeding element, and feeding output ports configured to feed processed electrical signals to the antenna radiator. The electrical signal of the first feeding element has a same phase on the feeding input ports. The electrical signal of the second feeding element has opposite phases on the feeding input ports.

20 Claims, 28 Drawing Sheets

(a)

(b)

(a)

(b)

(a)

(b)

(a)

(b)

ELECTRONIC DEVICE FOR MIMO ANTENNA

CROSS-REFERENCE TO RELATED APPLICATIONS

This is a U.S. National Stage of International Patent Application No. PCT/CN2021/140289 filed on Dec. 22, 2021, which claims priority to Chinese Patent Application No. 202110296431.7 filed on Mar. 19, 2021, and Chinese Patent Application No. 202011611722.2, filed on Dec. 30, 2020, all of which are hereby incorporated by reference in their entireties.

TECHNICAL FIELD

This application relates to the field of wireless communication, and in particular, to an electronic device.

BACKGROUND

With rapid development of wireless communication technologies, a second generation (second generation, 2G) mobile communication system mainly supports a call function, an electronic device is only a tool used by people to send and receive text messages and perform voice communication, and a wireless network access speed is very slow because data is transmitted through a voice channel. Currently, in addition to making a call, sending an SMS message, and taking a photo, the electronic device can also be used for listening to music online, watching an online movie and real-time video, and the like, covering various applications such as calling, film and television entertainment, and e-commerce in people's life. In these applications, a plurality of functional applications need to upload and download data through a wireless network. Therefore, high-speed data transmission is very important.

As people's demand for the high-speed data transmission increases, a multiple-input multiple-output (multiple-input multiple-output, MIMO) technology becomes particularly important. However, limited space inside the electronic device limits a frequency band that a MIMO antenna can cover and high performance. As a 5th generation (5th generation, 5G) wireless communication system requires more antennas, antennas share a radiator, so that space can be obviously multiplexed. In addition, an antenna design with high isolation and multi-band is becoming more important.

SUMMARY

This application provides an electronic device, and the electronic device may include an antenna structure. A first circuit of the antenna structure excites modes such as a half-wavelength mode, a one-time wavelength mode, and a three-half-wavelength mode of a CM mode, and may further excite modes such as a half-wavelength mode, a one-time wavelength mode, and a three-half-wavelength mode of a DM mode. The antenna structure can operate in the CM mode and the DM mode, and the antenna structure still has a plurality of resonances and a plurality of modes while having high isolation, which greatly improves practicability.

According to a first aspect, an electronic device is provided. The electronic device includes an antenna structure, where the antenna structure includes an antenna radiator, a first circuit, a first feeding element, and a second feeding element. The antenna radiator includes a first feeding point and a second feeding point, where the first feeding point and the second feeding point are respectively disposed on two sides of a virtual axis of the antenna radiator, the first feeding point and the second feeding point are symmetrical along the virtual axis, and electrical lengths of the antenna radiator on the two sides of the virtual axis are the same. The first circuit includes a first port, a second port, a third port, and a fourth port, where the first port and the second port are feeding output ports, the third port and the fourth port are feeding input ports, the feeding input ports are configured to input electrical signals of the first feeding element and the second feeding element, and the feeding output ports are configured to feed processed electrical signals to the antenna radiator. The first port is electrically connected to the first feeding point of the antenna radiator, and the second port is electrically connected to the second feeding point of the antenna radiator. The first feeding element is electrically connected to the third port and the fourth port, and the electrical signal of the first feeding element has a same phase on the third port and the fourth port. The second feeding element is electrically connected to the third port and the fourth port, and the electrical signal of the second feeding element has opposite phases on the third port and the fourth port.

According to the technical solution in this embodiment of this application, the first circuit is added to the antenna structure, so that a boundary condition corresponding to an (L−½) wavelength mode can be the same as a boundary condition corresponding to an M-time wavelength mode. A current corresponding to the (L−½) wavelength mode and a current corresponding to the M-time wavelength mode respectively go through different paths, to implement matching between the two modes, further to expand an operating bandwidth of the antenna structure. In addition, the first feeding element and the second feeding element may respectively excite the DM mode and the CM mode of the antenna structure. Therefore, in a same frequency band, good isolation can be maintained between resonant frequency bands respectively excited by the first feeding element and the second feeding element. The operating bandwidth of the antenna structure is further expanded.

With reference to the first aspect, in some implementations of the first aspect, when the first feeding element performs feeding, the electrical signal of the first feeding element passes through the first circuit, and is fed into the antenna radiator via the first port and the second port of the first circuit. When the second feeding element performs feeding, the electrical signal of the second feeding element passes through the first circuit, and is fed into the antenna radiator via the first port and the second port of the first circuit.

With reference to the first aspect, in some implementations of the first aspect, the antenna structure operates in at least one (L−½) wavelength mode and at least one M-time wavelength mode, where L and M are positive integers. An electrical signal corresponding to the at least one (L−½) wavelength mode in which the antenna structure operates and an electrical signal corresponding to the at least one M-time wavelength mode in which the antenna structure operates have different paths in the first circuit.

According to the technical solution in this embodiment of this application, because the first circuit is disposed, a current corresponding to the (L−½) wavelength mode and a current of the M-time wavelength mode go through different paths, to separately implement matching between the two modes.

With reference to the first aspect, in some implementations of the first aspect, the antenna radiator is symmetrical relative to the virtual axis.

According to the technical solution in this embodiment of this application, the virtual axis of the antenna radiator may be a virtual symmetry axis of the antenna radiator, and the antenna radiator is symmetrical to left and right along the symmetry axis. For the antenna structure, better symmetry of the structure indicates better isolation between resonant frequency bands respectively excited by the first feeding element and the second feeding element.

With reference to the first aspect, in some implementations of the first aspect, the electronic device further includes a first electric-conductor and a second electric-conductor. The antenna radiator includes a first radiator and a second radiator, and the first radiator and the second radiator are respectively disposed on the two sides of the virtual axis. A first end of the first radiator and a first end of the second radiator are opposite and do not contact each other, and form a first slot; a second end of the first radiator and a first end of the first electric-conductor form a second slot: and a second end of the second radiator and a first end of the second electric-conductor form a third slot.

With reference to the first aspect, in some implementations of the first aspect, the first electric-conductor and the second electric-conductor are a part of a ground, or both the first end of the first electric-conductor and the first end of the second electric-conductor are electrically connected to the ground.

According to the technical solution in this embodiment of this application, an example in which the first electric-conductor and the second electric-conductor are only a part of the ground is used. This is not limited in this application. In another embodiment of this application, the first electric-conductor and the second electric-conductor may be respectively electrically connected to the ground at first ends of the first electric-conductor and the second electric-conductor. For example, the first electric-conductor and the second electric-conductor are used as radiators of another antenna structure. It should be understood that, an electrical connection of the first end to the ground includes an electrical connection to the ground at the end, and also includes an electrical connection to the ground at a ground point on an electric-conductor near the end.

With reference to the first aspect, in some implementations of the first aspect, the first circuit includes a first inductor, a second inductor, a third inductor, and a fourth inductor. The first inductor is connected in series between the first port and the third port; the third inductor is connected in series between the second port and the fourth port: the second inductor is connected in parallel between the first inductor and the first port and is grounded; and the fourth inductor is connected in parallel between the third inductor and the second port and is grounded.

According to the technical solution in this embodiment of this application, the inductors are connected in parallel and connected in series in the first circuit, and the current corresponding to the (L−½) wavelength mode and the current of the M-time wavelength mode go through different paths, to separately implement matching between the two modes.

With reference to the first aspect, in some implementations of the first aspect, an inductance value of the first inductor is the same as an inductance value of the third inductor, and an inductance value of the second inductor is the same as an inductance value of the fourth inductor.

According to the technical solution in this embodiment of this application, an electronic component disposed between the first port and the third port and an electronic component disposed between the second port and the fourth port are symmetrical to each other.

With reference to the first aspect, in some implementations of the first aspect, the antenna structure generates a first resonance via the antenna radiator, the second inductor, the fourth inductor, the first feeding element, and the second feeding element. The antenna structure generates a second resonance via the antenna radiator, the first inductor, the third inductor, the first feeding element, and the second feeding element.

With reference to the first aspect, in some implementations of the first aspect, the first resonance corresponds to an (L−½) wavelength mode of the antenna structure. The second resonance corresponds to an M-time wavelength mode of the antenna structure, where L and M are positive integers.

According to the technical solution in this embodiment of this application, a boundary condition corresponding to the (L−½) wavelength mode is the same as a boundary condition corresponding to the M-time wavelength mode, and may be respectively matched with the (L−½) wavelength mode and the M-time wavelength mode. A same boundary condition may be considered as a same impedance corresponding to the antenna modes. Therefore, matching of the two modes can be implemented.

With reference to the first aspect, in some implementations of the first aspect, the electronic device further includes a first electric-conductor and a second electric-conductor. The antenna radiator is a complete metal piece, where one end of the antenna radiator and a first end of the first electric-conductor form a first slot, and the other end of the antenna radiator and the first end of the second electric-conductor form a second slot.

With reference to the first aspect, in some implementations of the first aspect, and the electronic device further includes a ground, the first electric-conductor and the second electric-conductor are a part of the ground, or both the first end of the first electric-conductor and the first end of the second electric-conductor are electrically connected to the ground.

In this application, an example in which the first electric-conductor and the second electric-conductor are only a part of the ground is used. This is not limited in this application. In another embodiment of this application, the first electric-conductor and the second electric-conductor may be respectively electrically connected to the ground at first ends of the first electric-conductor and the second electric-conductor. For example, the first electric-conductor and the second electric-conductor are used as radiators of another antenna structure. It should be understood that, an electrical connection of the first end to the ground includes an electrical connection to the ground at the end, and also includes an electrical connection to the ground at a ground point on an electric-conductor near the end.

With reference to the first aspect, in some implementations of the first aspect, the antenna radiator is a complete metal piece, and the antenna radiator is a wire antenna radiator.

With reference to the first aspect, in some implementations of the first aspect, the electronic device further includes a ground. The antenna radiator includes a first radiator and a second radiator, and the first radiator and the second radiator are respectively disposed on the two sides of the virtual axis. A first end of the first radiator and a first end of the second radiator are opposite and do not contact each other, and form a first slot; a second end of the first radiator is electrically connected to the ground; and a second end of the second radiator is electrically connected to the ground.

With reference to the first aspect, in some implementations of the first aspect, the first circuit includes a first capacitor, a second capacitor, and a third capacitor. The first capacitor is connected in series between the first port and the third port: the second capacitor is connected in series between the second port and the fourth port: and a first end of the third capacitor is disposed between the first capacitor and the first port, and a second end of the third capacitor is disposed between the second capacitor and the second port.

According to the technical solution in this embodiment of this application, the capacitors are connected in parallel and connected in series in the first circuit, and the current corresponding to the (L−½) wavelength mode and the current of the M-time wavelength mode go through different paths, to separately implement matching between the two modes.

With reference to the first aspect, in some implementations of the first aspect, capacitance values of the first capacitor and the second capacitor are the same.

According to the technical solution in this embodiment of this application, an electronic component disposed between the first port and the third port and an electronic component disposed between the second port and the fourth port are symmetrical to each other.

With reference to the first aspect, in some implementations of the first aspect, the antenna structure generates a first resonance via the antenna radiator, the first capacitor, the second capacitor, the first feeding element, and the second feeding element. The antenna structure generates a second resonance via the antenna radiator, the third capacitor, the first feeding element, and the second feeding element.

With reference to the first aspect, in some implementations of the first aspect, the first resonance corresponds to an (L−½) wavelength mode of the antenna structure. The second resonance corresponds to an M-time wavelength mode of the antenna structure, where L and M are positive integers.

According to the technical solution in this embodiment of this application, a boundary condition corresponding to the (L−½) wavelength mode is the same as a boundary condition corresponding to the M-time wavelength mode, and may be respectively matched with the (L−½) wavelength mode and the M-time wavelength mode. A same boundary condition may be considered as a same impedance corresponding to the two modes. Therefore, matching of the two modes can be implemented.

With reference to the first aspect, in some implementations of the first aspect, the electronic device further includes a 180° directional coupler. The 180° directional coupler is disposed between the first circuit and the first feeding element and the second feeding element. The 180° directional coupler is configured to enable the electrical signal of the first feeding element to have a same phase at the third port and the fourth port of the first circuit. The 180° directional coupler is further configured to enable the electrical signal of the second feeding element to have opposite phases at the third port and the fourth port of the first circuit.

According to the technical solution in this embodiment of this application, a 180° directional coupler 240 is merely a technical means for implementing that a phase of an electrical signal of a feeding element between a third port 123 and a fourth port 124 are the same or opposite, and may also be implemented via another technical means in actual production or design, for example, a balun, a 180° coupler, or a combination of a 90° coupler and a phase shift network. This is not limited in this application.

With reference to the first aspect, in some implementations of the first aspect, the electronic device further includes a first matching network and a second matching network. The first matching network is disposed between the first feeding element and the 180° directional coupler, and is configured to match an impedance of the first feeding element. The second matching network is disposed between the second feeding element and the 180° directional coupler, and is configured to match an impedance of the second feeding element.

According to the technical solution in this embodiment of this application, the first matching network is configured to match the impedance of the first feeding element and may match the electrical signal in the first feeding element with a characteristic of a radiator, so that transmission loss and distortion of the electrical signal are minimized. The second matching network is configured to match the impedance of the second feeding element, and may match the electrical signal in the second feeding element with a characteristic of a radiator, so that transmission loss and distortion of the electrical signal are minimized.

According to a second aspect, an electronic device is provided. The electronic device includes an antenna structure, where the antenna structure includes an antenna radiator, a first circuit, and a feeding element. The antenna radiator includes a first feeding point and a second feeding point, where the first feeding point and the second feeding point are respectively disposed on two sides of a virtual axis of the antenna radiator, the first feeding point and the second feeding point are symmetrical along the virtual axis, and electrical lengths of the antenna radiator on the two sides of the virtual axis are the same. The first circuit includes a first port, a second port, a third port, and a fourth port, where the first port and the second port are feeding output ports, the third port and the fourth port are feeding input ports, the feeding input ports are configured to input electrical signals of the feeding elements, and the feeding output ports are configured to feed processed electrical signals to the antenna radiator. The first port is electrically connected to the first feeding point of the antenna radiator, and the second port is electrically connected to the second feeding point of the antenna radiator. The feeding element is electrically connected to the third port and the fourth port, and the electrical signal of the feeding element has a same phase on the third port and the fourth port; or the electrical signal of the feeding element has opposite phases at the third port and the fourth port.

With reference to the second aspect, in some implementations of the second aspect, the antenna structure operates in at least one (L−½) wavelength mode and at least one M-time wavelength mode, where L and M are positive integers. An electrical signal corresponding to the at least one (L−½) wavelength mode in which the antenna structure operates and an electrical signal corresponding to the at least one M-time wavelength mode in which the antenna structure operates have different paths in the first circuit.

With reference to the second aspect, in some implementations of the second aspect, the antenna radiator is symmetrical relative to the virtual axis.

With reference to the second aspect, in some implementations of the second aspect, the electronic device further includes a first electric-conductor and a second electric-conductor. The antenna radiator includes a first radiator and a second radiator, and the first radiator and the second radiator are symmetrical along the virtual axis. A first end of the first radiator and a first end of the second radiator are opposite and do not contact each other, and form a first slot; a second end of the first radiator and a first end of the first electric-conductor form a second slot; and a second end of the second radiator and a first end of the second electric-conductor form a third slot.

With reference to the second aspect, in some implementations of the second aspect, and the electronic device further includes a ground, the first electric-conductor and the second electric-conductor are a part of the ground, or both the first end of the first electric-conductor and the first end of the second electric-conductor are electrically connected to the ground.

With reference to the second aspect, in some implementations of the second aspect, the first circuit includes a first inductor, a second inductor, a third inductor, and a fourth inductor. The first inductor is connected in series between the first port and the third port; the third inductor is connected in series between the second port and the fourth port: the second inductor is connected in parallel between the first inductor and the first port and is grounded; and the fourth inductor is connected in parallel between the third inductor and the second port and is grounded.

With reference to the second aspect, in some implementations of the second aspect, an inductance value of the first inductor is the same as an inductance value of the third inductor, and an inductance value of the second inductor is the same as an inductance value of the fourth inductor.

With reference to the second aspect, in some implementations of the second aspect, the antenna structure generates a first resonance via the antenna radiator, the second inductor, the fourth inductor, and the feeding element. The antenna structure generates a second resonance via the antenna radiator, the first inductor, the third inductor, and the feeding element.

With reference to the second aspect, in some implementations of the second aspect, the first resonance corresponds to an (L−½) wavelength mode of the antenna structure. The second resonance corresponds to an M-time wavelength mode of the antenna structure, where L and M are positive integers.

With reference to the second aspect, in some implementations of the second aspect, the electronic device further includes a ground. The antenna radiator includes a first radiator and a second radiator, and the first radiator and the second radiator are respectively disposed on the two sides of the virtual axis. A first end of the first radiator and a first end of the second radiator are opposite and do not contact each other, and form a first slot; a second end of the first radiator is electrically connected to the ground; and a second end of the second radiator is electrically connected to the ground.

With reference to the second aspect, in some implementations of the second aspect, the first circuit includes a first capacitor, a second capacitor, and a third capacitor. The first capacitor is connected in series between the first port and the third port; the second capacitor is connected in series between the second port and the fourth port: and a first end of the third capacitor is disposed between the first capacitor and the first port, and a second end of the third capacitor is disposed between the second capacitor and the second port.

With reference to the second aspect, in some implementations of the second aspect, capacitance values of the first capacitor and the second capacitor are the same.

With reference to the second aspect, in some implementations of the second aspect, the antenna structure generates a first resonance via the antenna radiator, the first capacitor, the second capacitor, and the feeding element. The antenna structure generates a second resonance via the antenna radiator, the third capacitor, and the feeding element.

With reference to the second aspect, in some implementations of the second aspect, the first resonance corresponds to an (L−½) wavelength mode of the antenna structure. The second resonance corresponds to an M-time wavelength mode of the antenna structure, where L and M are positive integers.

With reference to the second aspect, in some implementations of the second aspect, the electronic device further includes a 180° directional coupler. The 180° directional coupler is disposed between the first circuit and the first feeding element and the second feeding element. The 180° directional coupler is configured to enable the electrical signal of the first feeding element to have a same phase at the third port and the fourth port of the first circuit. The 180° directional coupler is further configured to enable the electrical signal of the second feeding element to have opposite phases at the third port and the fourth port of the first circuit.

DESCRIPTION OF EMBODIMENTS

The following describes the technical solutions in this application with reference to the accompanying drawings.

It should be understood that, in this application, "electrical connection" may be understood that components contact physically and conduct electrically. It may also be understood as a form in which different components in a line structure are connected through physical lines that can transmit an electrical signal, such as a printed circuit board (printed circuit board, PCB) copper foil or a conducting wire. A "communication connection" may refer to an electrical signal transmission, including a wireless communication connection and a wired communication connection. The wireless communication connection does not require a physical medium and does not belong to a connection relationship that defines a construction of a product. Both "connection" and "interconnection" may mean a mechanical connection relationship or a physical connection relationship. For example, A-B connection or A-B interconnection may mean that a fastened component (such as a screw, a bolt, a rivet, etc.) exists between A and B; or A and B are in contact with each other and are difficult to be separated.

The technical solutions provided in this application are applicable to an electronic device that uses one or more of the following communication technologies: a Bluetooth (Bluetooth, BT) communication technology, a global positioning system (global positioning system, GPS) communication technology, a wireless fidelity (wireless fidelity, Wi-Fi) communication technology, a global system for mobile communications (global system for mobile communications. GSM) communication technology, a wideband code division multiple access (wideband code division multiple access, WCDMA) communication technology, a long term evolution (long term evolution, LTE) communication technology, a 5G communication technology, and other future communication technologies. The electronic device in embodiments of this application may be a mobile phone, a tablet computer, a laptop computer, a smart band, a smart watch, a smart helmet, smart glasses, or the like. Alternatively, the electronic device may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, an electronic device in a 5G network, an electronic device in a future evolved public land mobile network (public land mobile network, PLMN), or the like. This is not limited in this embodiment of this application.

Figure 1:
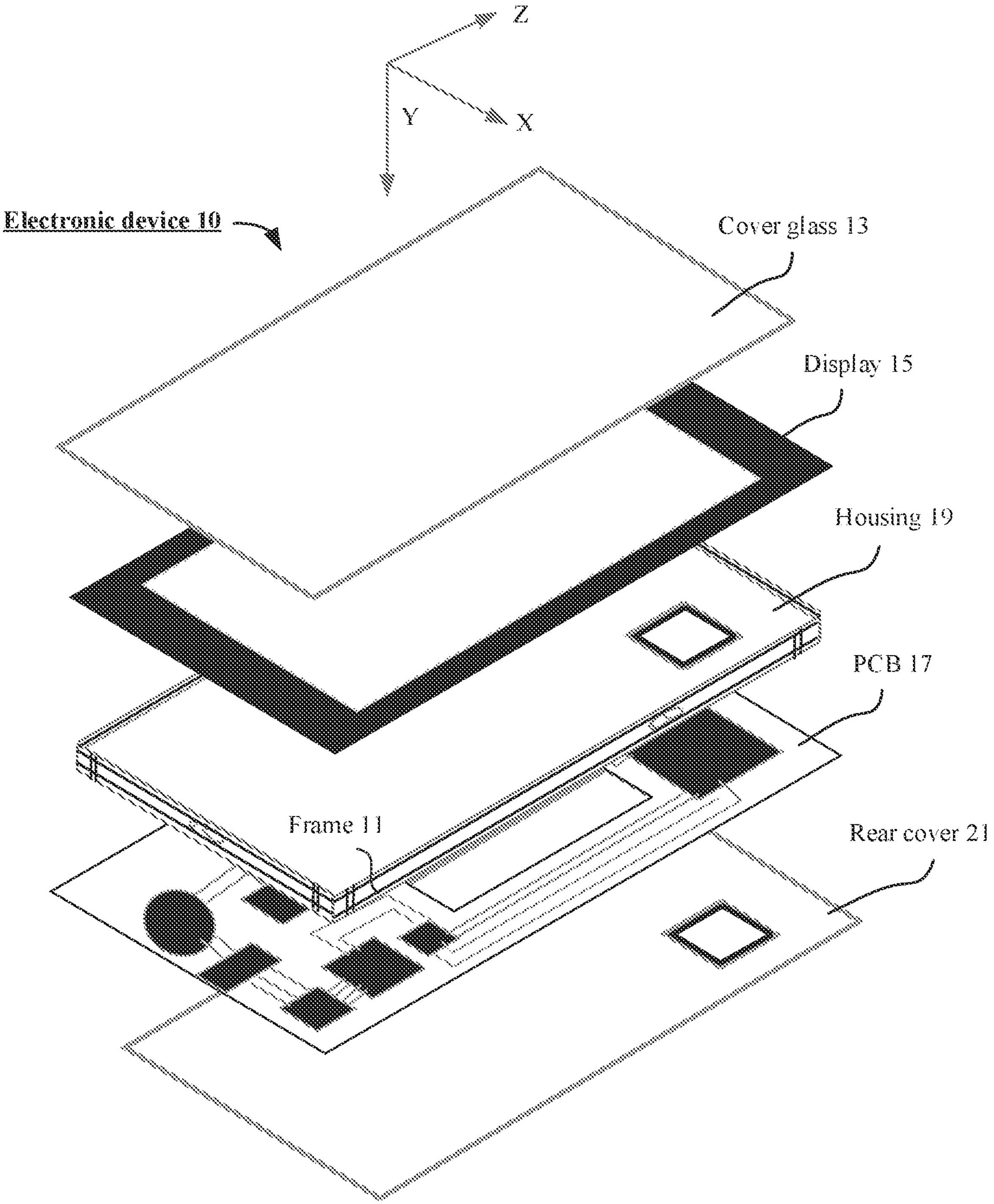
FIG. 1 is a schematic diagram of an electronic device according to an embodiment of this application.

FIG. 1 shows an example of an internal environment of an electronic device according to this application. An example in which the electronic device is a mobile phone is used for description.

As shown in FIG. 1, an electronic device 10 may include a cover glass (cover glass) 13, a display (display) 15, a printed circuit board (printed circuit board, PCB) 17, a housing (housing) 19, and a rear cover (rear cover) 21.

The cover glass 13 may be disposed close to the display 15, and may be mainly configured to protect the display 15 from dust.

In an embodiment, the display 15 may be a liquid crystal display (liquid crystal display, LCD), a light-emitting diode (light-emitting diode, LED), an organic light-emitting diode (organic light-emitting diode, OLED), or the like. This is not limited in this application.

The printed circuit board PCB 17 may be a flame-resistant material (FR-4) dielectric board, or may be a Rogers (Rogers) dielectric board, or may be a dielectric board mixing Rogers and FR-4, or the like. Here, FR-4 is a grade designation for a flame-resistant material the Rogers dielectric board is a high-frequency board. A metal layer may be disposed on a side of the printed circuit board PCB 17 close to the housing 19, and the metal layer may be formed by etching metal on a surface of the PCB 17. The metal layer may be used for grounding an electronic component carried on the printed circuit board PCB 17, to prevent an electric shock of a user or damage to a device. The metal layer may be referred to as a PCB ground. Not limited to the PCB ground, the electronic device 10 may alternatively have another ground for grounding, for example, a metal middle frame or another metal plane in the electronic device. In addition, a plurality of electronic components are disposed on the PCB 17, and the plurality of electronic components include one or more of a processor, a power management module, a memory, a sensor, a SIM card interface, and the like. Metal is also disposed inside or on surfaces of these electronic components.

The electronic device 10 may alternatively include a battery, which is not shown herein. The battery may be disposed in the housing 19, the battery may divide the PCB 17 into a main board and a sub-board, the main board may be disposed between a frame 11 of the housing 19 and an upper edge of the battery, and the sub-board may be disposed between the housing 19 and a lower edge of the battery. A metal layer is also disposed inside or on the surface of the battery.

The housing 19 is mainly used to support the electronic device 10. The housing 19 may include the frame 11, and the frame 11 may be formed of a conductive material such as metal. The frame 11 may extend around peripheries of the electronic device 10 and the display 15. The frame 11 may specifically surround four side edges of the display 15, to help fasten the display 15. In an implementation, the frame 11 made of a metal material may be directly used as a metal frame of the electronic device 10 to form an appearance of the metal frame, and is applicable to a metal industrial design (industrial design, ID). In another implementation, an outer surface of the frame 11 may alternatively be a non-metal material, for example, a plastic frame, to form an appearance of the non-metal frame, and is applicable to a non-metal ID.

The rear cover 21 may be a rear cover made of a metal material, or may be a rear cover made of a non-conductive material, such as a non-metallic rear cover: a glass rear cover or a plastic rear cover.

FIG. 1 schematically shows only some components included in the electronic device 10. Actual shapes, actual sizes, and actual structures of these components are not limited in FIG. 1. In addition, the electronic device 10 may alternatively include components such as a camera and a sensor.

Figure 2:
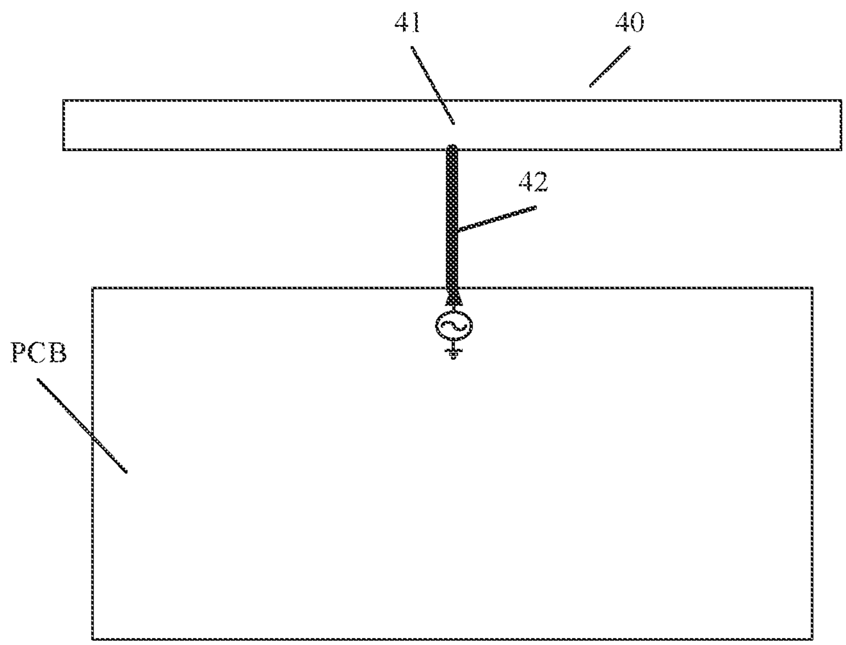
FIG. 2 shows diagrams of a common-mode structure of a wire antenna and distribution of corresponding currents and electric fields according to this application.
Figure 2:
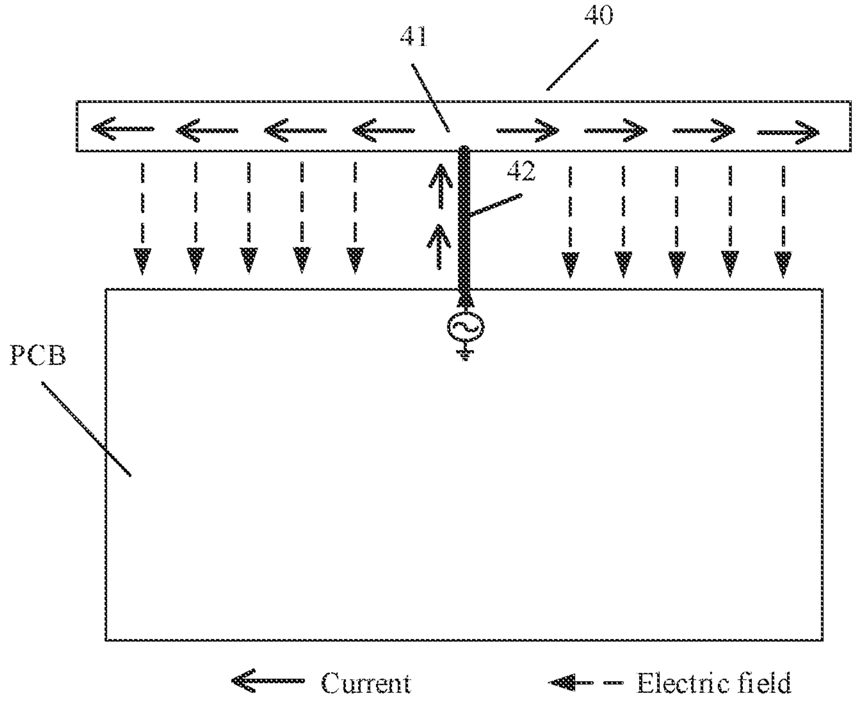
Figure 3:
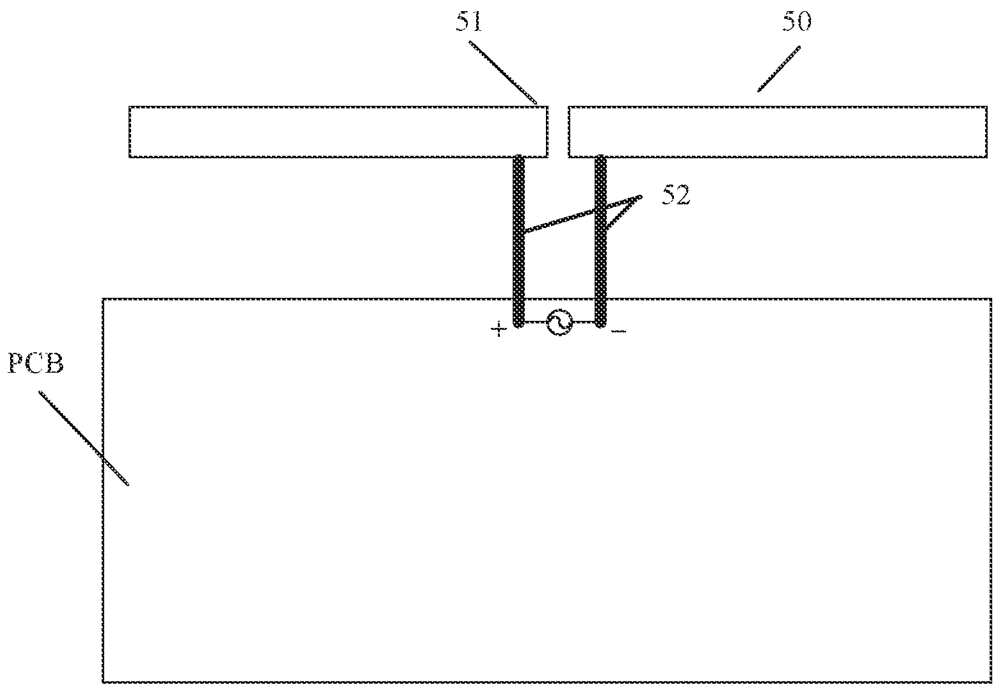
FIG. 3 shows diagrams of a differential-mode structure of a wire antenna and distribution of corresponding currents and electric fields according to this application.
Figure 3:
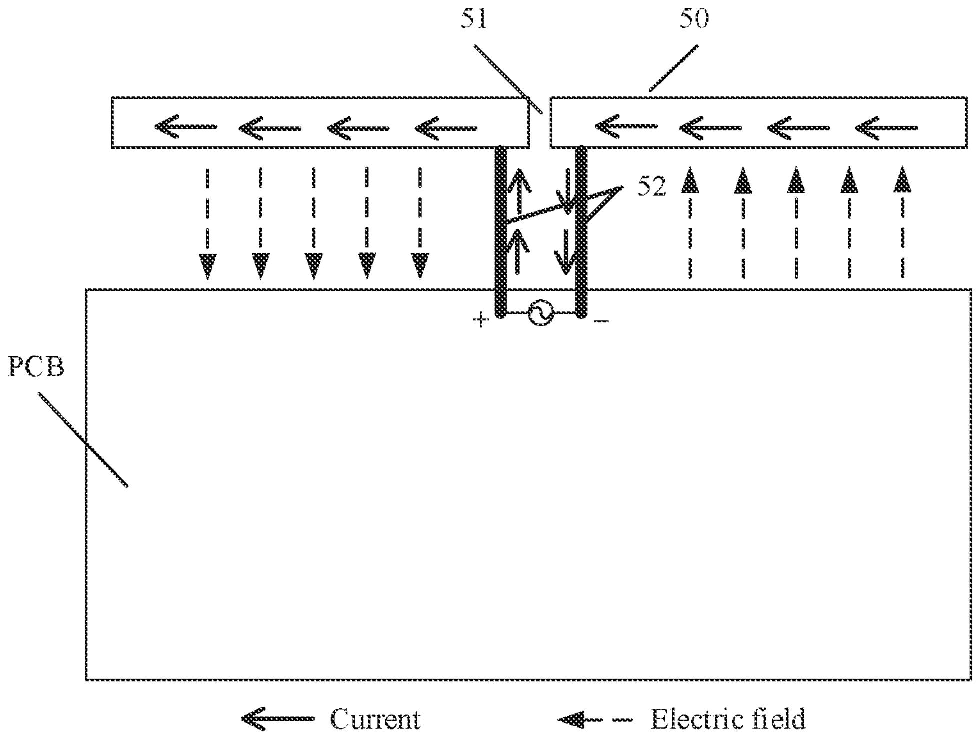
Figure 4:
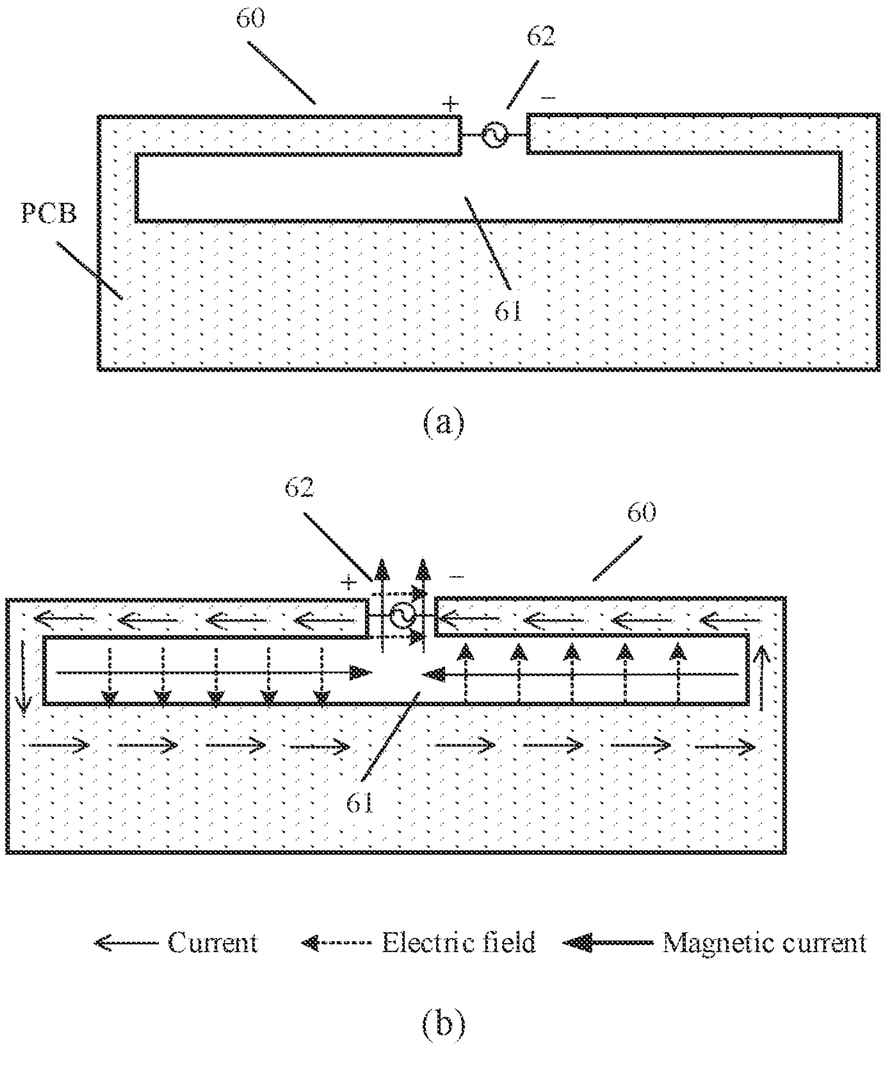
FIG. 4 shows diagrams of a common-mode structure of a slot antenna and distribution of corresponding currents, electric fields, and magnetic currents according to this application.
Figure 5:
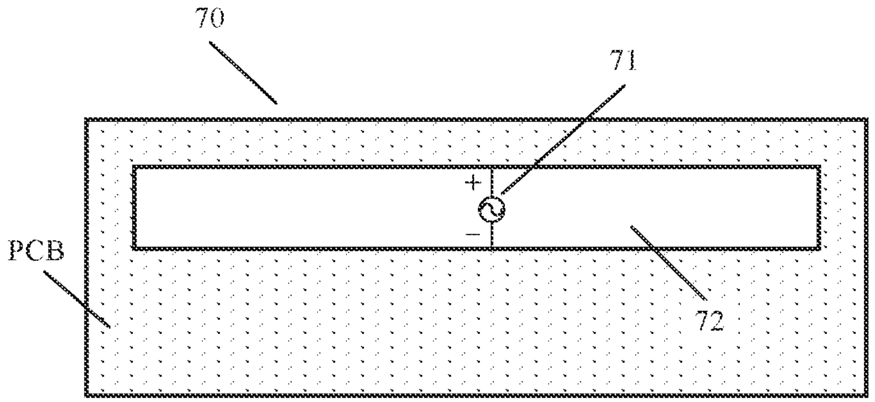
FIG. 5 shows diagrams of a differential-mode structure of a slot antenna and distribution of corresponding currents, electric fields and magnetic currents according to this application.
Figure 5:
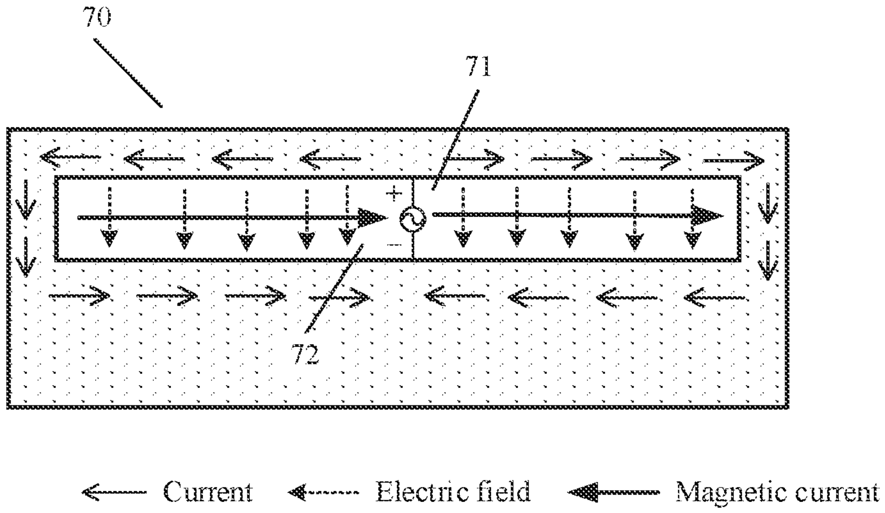

First, this application relates to four antenna modes as described with reference to FIG. 2 to FIG. 5. FIG. 2 is a schematic diagram of a common-mode structure of a wire antenna and distribution of corresponding currents and electric fields according to this application. FIG. 3 is a schematic diagram of another differential-mode structure of a wire antenna and distribution of corresponding currents and electric fields according to this application. FIG. 4 is a schematic diagram of a common-mode structure of a slot antenna and distribution of corresponding currents, electric fields, and magnetic currents according to this application. FIG. 5 is a schematic diagram of another differential-mode structure of a slot antenna and distribution of corresponding currents, electric fields and magnetic currents according to this application.

1. Common Mode (Common Mode, CM) of a Wire Antenna

Herein. (a) in FIG. 2 shows a case in which a radiator of a wire antenna 40 is grounded (for example, connected to a ground, which may be a PCB) through a feeding line 42. The wire antenna 40 is connected to a feeding element (not shown) at a middle position 41, and uses a symmetrical feed (symmetrical feed). The feeding element may be connected to the middle position 41 of the wire antenna 40 through the feeding line 42. It should be understood that the symmetrical feed may be understood as that one end of the feeding element is connected to the radiator and the other end is grounded. A connection point (feeding point) between the feeding element and the radiator is located in a center of the radiator, and the center of the radiator may be, for example, a midpoint of a collective structure, or a midpoint of an electrical length (or an area within a specific range near the midpoint).

The middle position 41 of the wire antenna 40, for example, the middle position 41, may be a geometric center of the wire antenna, or the midpoint of the electrical length of the radiator, for example, a connection between the feeding line 42 and the wire antenna 40 covers the middle position 41.

Herein, (b) in FIG. 2 shows current and electric field distribution of the wire antenna 40. As shown in (b) in FIG. 2, the currents are symmetrically distributed on both sides of the middle position 41, for example, reversely distributed. The electric fields are distributed in the same direction on both sides of the middle position 41. As shown in (b) in FIG. 2, the currents at the feeding line 42 are distributed in the same direction. Based on the co-directional distribution of currents at the feeding line 42, such a feed as shown in (a) in FIG. 2 may be referred to as a CM feed of a wire antenna. Based on the symmetrical distribution of the currents at on two sides of the connection between the radiator and the feeding line 42, the wire antenna mode shown in (b) in FIG. 2 may be referred to as a CM mode of the wire antenna (or may be referred to as a CM wire antenna for short). Currents and electric fields shown in (b) in FIG. 2 may be referred to as currents and electric fields of the CM mode of the wire antenna, respectively.

The currents and electric fields of the CM mode of the wire antenna are generated by two branches (for example, two horizontal branches) on both sides of the middle position 41 of the wire antenna 40 as antennas operating in a quarter-wavelength mode. The current is strong at the middle position 41 of the wire antenna 40 and weak at two ends of a wire antenna 101. The electric field is weak at the middle position 41 of the wire antenna 40 and strong at two ends of the wire antenna 40.

2. Differential Mode (Differential Mode, DM) of the Wire Antenna

Herein, (a) in FIG. 3 shows a case in which two radiators of a wire antenna 50 are grounded (for example, connected to a ground, which may be a PCB) through a feeding line 52. The wire antenna 50 connects a feeding element at a middle position 51 between the two radiators and uses an anti-symmetrical feed (anti-symmetrical feed). One end of the feeding element is connected to one of the radiators through the feeding line 52, and the other end of the feeding element is connected to the other of the radiators through the feeding line 52. The middle position 51 may be a geometric center of the wire antenna, or a slot between the radiators.

It should be understood that the anti-symmetrical feed may be understood as that positive and negative poles of the feeding element are respectively connected to two ends of the radiator. Signals output from the positive and negative poles of the feeding element have the same amplitude but opposite phases, for example, a phase difference is 180°±10°.

(b) in FIG. 3 shows current and electric field distribution of the wire antenna 50. As shown in (b) in FIG. 3, the currents are asymmetrically distributed on two sides of the middle position 51 of the wire antenna 50, for example, distributed in the same direction. The electric fields are distributed reversely on both sides of the middle position 51. As shown in (b) in FIG. 3, the currents at the feeding line 52 are distributed reversely. Based on the reverse distribution of the currents at the feeding line 52, such a feed as shown in (a) in FIG. 3 may be referred to as a DM feed of a wire antenna. Based on the asymmetrical distribution (for example, the co-directional distribution) of the currents at both sides of the connection between the radiator and the feeding line 52, the wire antenna mode shown in (b) in FIG. 3 may be referred to as a DM mode of the wire antenna (or may be referred to as a DM wire antenna for short). Currents and electric fields shown in (b) in FIG. 3 may be referred to as currents and electric fields in the DM mode of the wire antenna, respectively.

The currents and electric fields in the DM mode of the wire antenna are generated by the entire wire antenna 50 as an antenna operating in a half-wavelength mode. The current is strong at the middle position 51 of the wire antenna 50 and weak at two ends of the wire antenna 50. The electric field is weak at the middle position 51 of the wire antenna 50 and strong at two ends of the wire antenna 50.

It should be understood that the radiator of the wire antenna may be understood as a metal mechanical part that generates radiation, and a quantity of the radiator may be one, as shown in FIG. 2, or may be two, as shown in FIG. 3, and may be adjusted according to an actual design or production requirement. For example, for the CM mode of the wire antenna, as shown in FIG. 3, two radiators may also be used, two ends of the two radiators are oppositely disposed and a slot is spaced apart, and two ends that are close to each other use a symmetrical feed manner. For example, an effect similar to that of the antenna structure shown in FIG. 2 may also be obtained by separately feeding a same feed signal into two ends that are close to each other of the two radiators. Correspondingly, for the DM mode of the wire antenna, as shown in FIG. 2, one radiator may also be used, and two feeding points are disposed in the middle position of the radiator, and an anti-symmetrical feed manner is used. For example, an effect similar to that of the antenna structure shown in FIG. 3 may also be obtained if signals of a same amplitude and opposite phases are respectively fed into two symmetrical feeding points on the radiator.

3. CM Mode of the Slot Antenna

A slot antenna 60 shown in (a) in FIG. 4 may be formed by a hollowed-out groove or a slot 61 in a radiator of the slot antenna, or may be formed by a radiator of the slot antenna and a ground (for example, a ground, which may be a PCB) enclosing the groove or the slot 61. The slot 61 may be formed by providing a slot on the ground. An opening 62 is disposed on one side of the slot 61, and the opening 62 may be specifically disposed in a middle position of the side. The middle position of the side of the slot 61 may be, for example, a geometric midpoint of the slot antenna, or a midpoint of an electrical length of the radiator. For example, an area of the opening 62 on the radiator covers the middle position of the side. A feeding element may be connected at the opening 62, and anti-symmetrical feed is used. It should be understood that the anti-symmetrical feed may be understood as that positive and negative poles of the feeding element are respectively connected to two ends of the radiator. Signals output from the positive and negative poles of the feeding element have the same amplitude but opposite phases, for example, a phase difference is $180°\pm10°$.

Herein, (b) in FIG. 4 shows current, electric field, and magnetic current distribution of the slot antenna 60. As shown in (b) in FIG. 4, currents are distributed in a same direction around the slot 61 on a conductor (for example, a ground and/or a radiator 60) around the slot 61, and the electric fields are distributed reversely on two sides of a middle position of the slot 61. The magnetic currents are distributed reversely on both sides of the middle position of the slot 61. As shown in (b) in FIG. 4, electric fields are in the same direction at the opening 62 (for example, a feeding position), and magnetic currents are in the same direction at the opening 62 (for example, the feeding position). Based on co-directional magnetic currents at the opening 62 (the feeding position), the feed shown in (a) in FIG. 4 may be referred to as CM feed for the slot antenna. On the basis that the currents are distributed asymmetrically (for example, in the same direction) on the radiators on both sides of the opening 62, or on the basis that the currents are distributed in the same direction around the slot 61 on the conductor around the slot 61, the slot antenna mode shown in (b) in FIG. 4 may be referred to as a CM mode of the slot antenna (which may also be referred to as a CM slot antenna or a CM slot antenna for short). The electric field, the current, and the magnetic current distribution shown in (b) in FIG. 4 may be respectively referred to as an electric field, a current, and a magnetic current distribution of a CM mode of the slot antenna.

The current and the electric field of the CM mode of the slot antenna are generated via slot antenna bodies on both sides of the middle position of the slot antenna 60 as antennas operating in a half-wavelength mode. The magnetic field is weak at the middle position of the slot antenna 60, and strong at two ends of the slot antenna 60. The electric field is strong at the middle position of the slot antenna 60, and weak at two ends of the slot antenna 60.

4. DM Mode of the Slot Antenna

A slot antenna 70 shown in (a) in FIG. 5 may be formed by a hollowed-out groove or a slot 72 in a radiator of the slot antenna, or may be formed by a radiator of the slot antenna and a ground (for example, a ground, which may be a PCB) enclosing the groove or the slot 72. The slot 72 may be formed by providing a slot on the ground. A middle position 71 of the slot 72 is connected to a feeding element, and symmetrical feed is used. It should be understood that the symmetrical feed may be understood as that one end of the feeding element is connected to the radiator and the other end is grounded. A connection point (feeding point) between the feeding element and the radiator is located in a center of the radiator, and the center of the radiator may be, for example, a midpoint of a collective structure, or a midpoint of an electrical length (or an area within a specific range near the midpoint). A middle position of one side of the slot 72 is connected to a positive electrode of the feeding element, and a middle position of the other side of the slot 72 is connected to a negative electrode of the feeding element. The middle position of the side of the slot 72 may be, for example, the middle position of the slot antenna 60/the middle position of the ground, for example, a geometric midpoint of the slot antenna, or a midpoint of an electrical length of the radiator. For example, a connection between the feeding element and the radiator covers the middle position 51 of the side.

Herein, (b) in FIG. 5 shows current, electric field, and magnetic current distribution of the slot antenna 70. As shown in (b) in FIG. 5, on a conductor (such as the ground and/or the radiator 60) around the slot 72, currents are distributed around the slot 72, and are distributed reversely on both sides of a middle position of the slot 72, and electric fields are distributed in a same direction on both sides of the middle position 71. The magnetic currents are distributed in the same direction on both sides of the middle position 71. Magnetic currents are reversely distributed at the feeding element (not shown). Based on reverse distribution of the magnetic currents at the feeding element, the feed shown in (a) in FIG. 5 may be referred to as DM feed for the slot antenna. On the basis that the currents are symmetrically distributed (for example, reversely distributed) on two sides of a connection between the feeding element and the radiator, or on the basis that the currents are symmetrically distributed (for example, reversely distributed) around the slot 71. The slot antenna mode shown in (b) in FIG. 5 may be referred to as a DM mode of the slot antenna (which may also be referred to as a DM slot antenna or a DM slot antenna for short). The electric field, the current, and the magnetic current distribution shown in (b) in FIG. 5 may be referred to as an electric field, a current, and a magnetic current of a DM mode of the slot antenna.

The currents and electric fields of the DM mode of the slot antenna are generated by the entire slot antenna 70 as an antenna operating in a one-time wavelength mode. The current is weak at the middle position of the slot antenna 70, and strong at two ends of the slot antenna 70. The electric field is strong at the middle position of the slot antenna 70, and weak at two ends of the slot antenna 70.

In the antenna field, an antenna operating in the CM mode and an antenna operating in the DM mode generally have high isolation. In addition, frequency bands of the antennas operating in the CM mode and operating in the DM mode are usually single-mode resonance, and it is difficult to cover a plurality of frequency bands required for communication. In particular, space left by an electronic device for an antenna structure is decreasing day by day. For a MIMO system, a single antenna structure is required to implement coverage of the plurality of frequency bands. Therefore, an antenna with multi-mode resonance and high isolation is of high research and practical value.

It should be understood that the radiator of the slot antenna may be understood as a metal mechanical part (for example, including a part of a ground) that generates radiation, and may include an opening, as shown in FIG. 4, or may be a complete ring, as shown in FIG. 5, and may be adjusted according to an actual design or production requirement. For example, for the CM mode of the slot antenna, as shown in FIG. 5, a complete ring radiator may also be used, and two feeding points are disposed in a middle position of the radiator on one side of the slot 61, and an anti-symmetrical feed manner is used. For example, signals of a same amplitude and opposite phases are respectively fed into two ends of an original opening position, so that an effect similar to that of the antenna structure shown in FIG. 4 can also be obtained. Correspondingly, for the DM mode of the slot antenna, as shown in FIG. 4, a radiator including an opening may also be used, and a symmetrical feed manner is used at two ends of the opening position. For example, a same feed signal is respectively fed into two ends of the radiator on two sides of the opening. An effect similar to that of the antenna structure shown in FIG. 5 may also be obtained.

This application provides an electronic device, and the electronic device may include an antenna structure. A first circuit of the antenna structure excites modes such as a half-wavelength mode, a one-time wavelength mode, and a three-half-wavelength mode of a CM mode, and may further excite modes such as a half-wavelength mode, a one-time wavelength mode, and a three-half-wavelength mode of a DM mode. The antenna structure can operate in the CM mode and the DM mode, and the antenna structure still has a plurality of resonances and a plurality of modes while having high isolation, which greatly improves practicability. In addition, because an antenna operating in the CM mode and an antenna operating in the DM mode share a same radiator, a volume of the antenna structure can also be effectively reduced.

Figure 6:
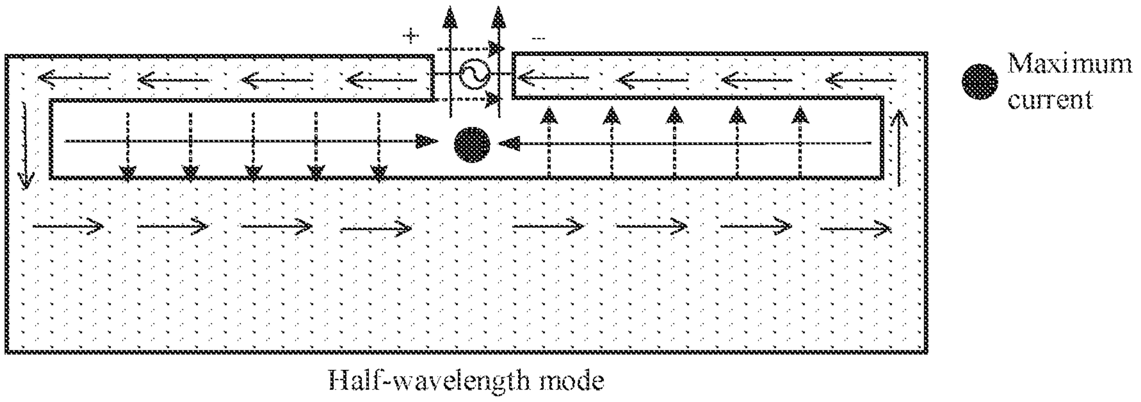
FIG. 6 is a distribution diagram of current intensity points of a slot antenna according to an embodiment of this application.
Figure 6:
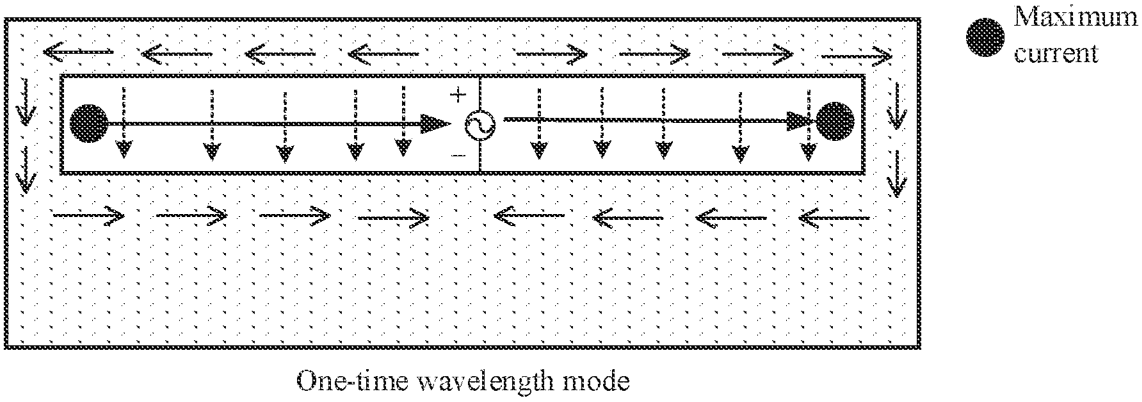

FIG. 6 is a distribution diagram of current intensity points of a slot antenna according to an embodiment of this application.

As shown in (a) in FIG. 6, current distribution of a slot antenna operating in a half-wavelength mode is shown. The slot antenna uses anti-symmetrical feed, and the current intensity points of the slot antenna are located in an area in which the feeding element is located. A radiator itself has a plurality of modes that can be excited, and a corresponding mode can be excited as long as an input impedance of the radiator is consistent with an impedance of an excitation source. Therefore, when the excitation source uses the input impedance corresponding to the current distribution shown in (a) in FIG. 6, the half-wavelength mode of the slot antenna can be excited, and an (N−½) wavelength mode of the slot antenna can be excited, where N is a positive integer. For a slot antenna or a wire antenna, the (N−½) wavelength mode of the slot antenna may be considered as follows: A wavelength corresponding to resonance generated by the antenna structure in this mode is approximately (N−½) times of an electrical length of a radiator in the antenna structure. It should be understood that approximately (N−½) times means that due to an operating environment of the antenna structure and settings of a matching circuit and the like, a relationship between the wavelength corresponding to the resonance generated in the (N−½) wavelength mode and the electrical length of the radiator may not be strictly (N−½) times, but a specific error is allowed. In addition, the antenna structure has (N−½)/(½) current zero points in the (N−½) wavelength mode. This is specifically described in FIG. 14 below, and details are not described herein again.

It should be understood that anti-symmetrical feed may be understood as that positive and negative poles of the feeding element are respectively connected to two ends of the radiator. Signals output from the positive and negative poles of the feeding element have the same amplitude but opposite phases, for example, a phase difference is 180°±10°.

As shown in (b) in FIG. 6, current distribution of a slot antenna operating in a one-time wavelength mode is shown. The slot antenna uses symmetrical feed, and current intensity points of the slot antenna are located on two sides of the slot. When the excitation source uses the input impedance corresponding to the current distribution shown in (b) in FIG. 6, the one-time wavelength mode of the slot antenna can be excited, and N-time wavelength mode of the slot antenna can be excited, where N is a positive integer. For a slot antenna or a wire antenna, the N-time wavelength mode of the slot antenna may be considered as follows: A wavelength corresponding to resonance generated by the antenna structure in this mode is approximately N times of an electrical length of a radiator in the antenna structure. It should be understood that approximately N times means that due to an operating environment of the antenna structure and settings of a matching circuit and the like, a relationship between the wavelength corresponding to the resonance generated in the N-time wavelength mode and the electrical length of the radiator may not be strictly N times, but a specific error is allowed. In addition, the antenna structure has N/(½) current zero points in the N-time wavelength mode. This is specifically described in FIG. 14 below, and details are not described herein again.

It should be understood that the symmetrical feed may be understood as that one end of the feeding element is connected to the radiator and the other end is grounded. A connection point (feeding point) between the feeding element and the radiator is located in a center of the radiator, and the center of the radiator may be, for example, a midpoint of a collective structure, or a midpoint of an electrical length (or an area within a specific range near the midpoint).

Therefore, for the slot antenna shown in (a) in FIG. 6, the N-time wavelength mode of the slot antenna is not excited. When the slot antenna operates in the half-wavelength mode, a current intensity point corresponding to the one-time wavelength mode is a current weak point, and vice versa. For an impedance of the N-time wavelength mode and an impedance of the (N−½) wavelength mode, the (N−½) wavelength mode corresponds to a high impedance, and the N-time wavelength mode corresponds to a low impedance. As a result, it is difficult to match the two modes at the same time, or the two modes cannot be excited at the same time.

Figure 7:
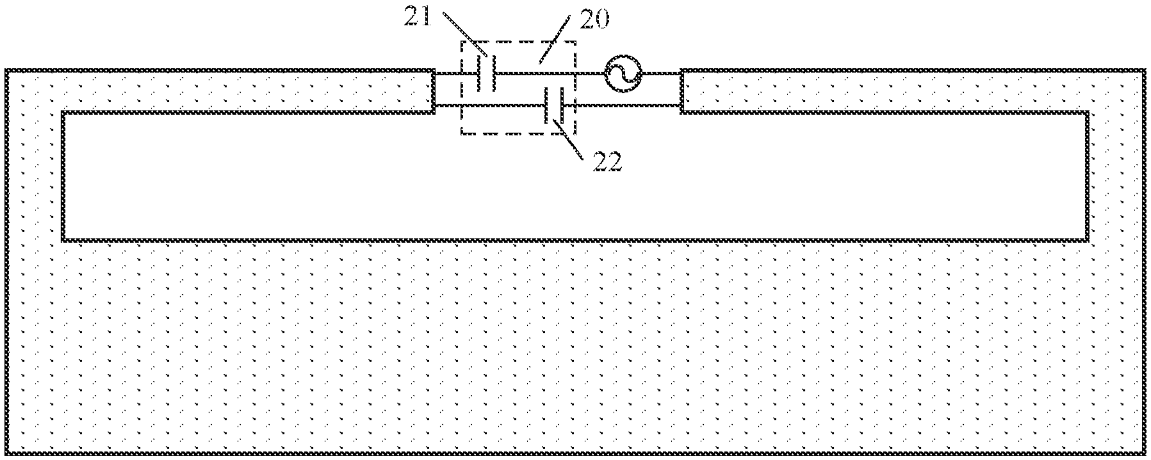
FIG. 7 is a schematic diagram of a structure of a slot antenna according to an embodiment of this application.

FIG. 7 is a schematic diagram of a structure of a slot antenna according to an embodiment of this application.

As shown in FIG. 7, a circuit 20 is added between a feeding element and a radiator, so that a current corresponding to an (N−½) wavelength mode and a current corresponding to an N-time wavelength mode separately go different paths, to implement matching between the two modes. The circuit 20 may be a filter circuit, a matching circuit, a circuit in another form, or a combination of these circuits. This is not limited in this application.

As shown in FIG. 7, the slot antenna uses anti-symmetrical feed. From an input impedance of the anti-symmetrical feed, an impedance of a half-wavelength mode is a high impedance, and an impedance of a one-time wavelength mode is a low impedance. The impedance of the half-wavelength mode is often opposite to that of the one-time wavelength mode. It should be understood that, for the half-wavelength mode and the one-time wavelength mode, boundary conditions of the two modes are different (opposite impedances). To ensure that the half-wavelength mode and the one-time wavelength mode are excited in a same antenna, it is desirable for the circuit 20 to make the boundary conditions of the half-wavelength mode and the one-time wavelength mode the same, for example, both are high impedance or both are low impedance. A series capacitor 21 may match the half-wavelength mode, so that a current in this mode goes through the capacitor 21 connected in series by the feeding element, and a parallel capacitor 22 may match the one-time wavelength mode, so that a current in this mode goes through the capacitor 22 connected in parallel by the feeding element. For example, the radiator of the slot antenna, the feeding element, and the series capacitor 21 generate a first resonance, which corresponds to the half-wavelength mode. In this mode, a current has a zero point. For another example, the radiator of the slot antenna, the feeding element, and the parallel capacitor 22 generate a second resonance, which corresponds to the one-time wavelength mode. In this mode, a current has two zero points. It should be understood that the foregoing capacitors match corresponding modes to change current paths of electrical signals in the modes corresponding to the capacitors. Therefore, the circuit 20 may match a plurality of modes of the slot antenna, to implement multi-resonance, and to expand a bandwidth of the antenna.

Figure 8:
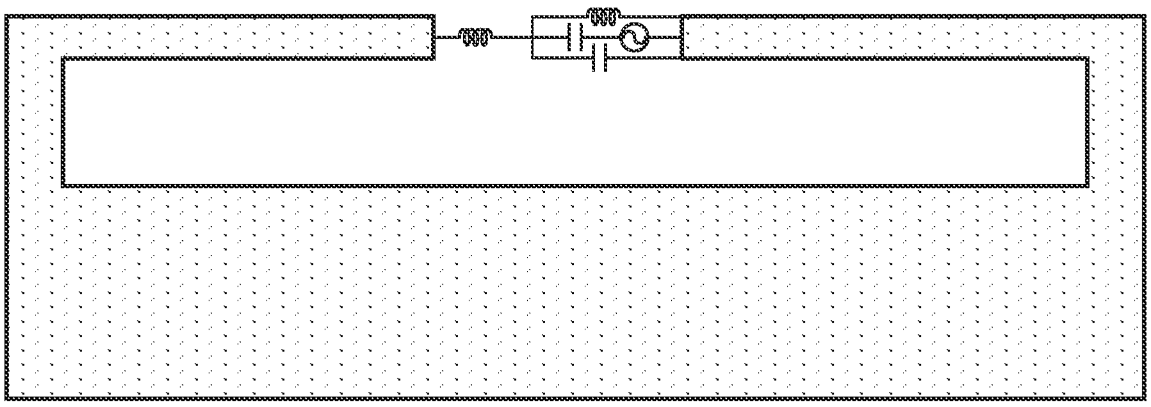
FIG. 8 is a schematic diagram of another structure of a slot antenna according to an embodiment of this application.

It should be understood that the circuit 20 shown in FIG. 7 is merely an example. The circuit 20 is configured to make a current path of the half-wavelength mode different from a current path of the one-time wavelength mode, so that boundary conditions corresponding to the half-wavelength mode and the one-time wavelength mode are the same. In addition, an electronic component may also be added on the circuit 20, and an equivalent electrical length of the radiator may be changed, to implement fine-tuning of a resonance frequency, as shown in FIG. 8. This is not limited in this application, and may be adjusted according to actual production or design.

Figure 9:
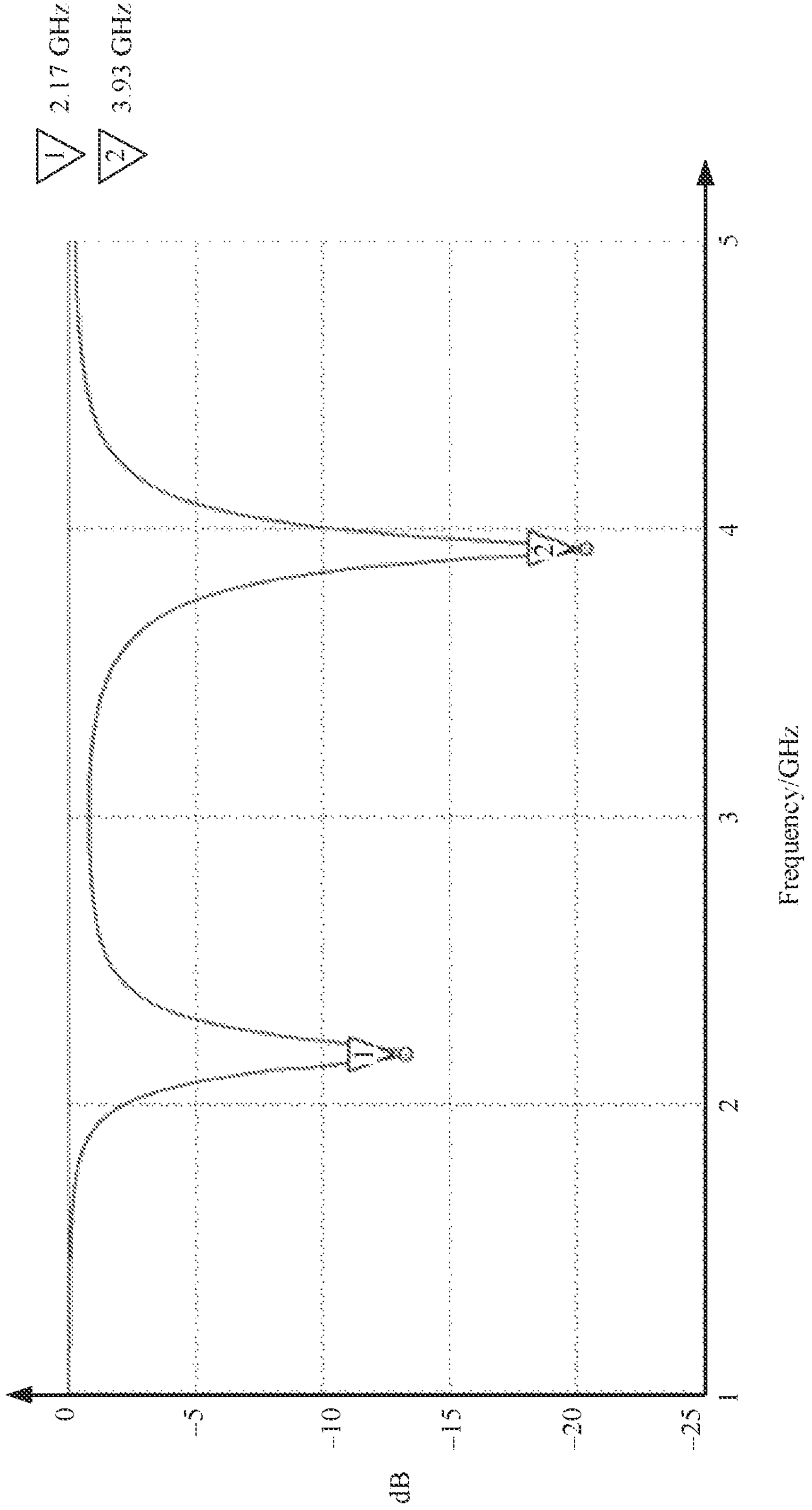
FIG. 9 is an S-parameter simulation result diagram of the antenna structure shown in FIG. 7.
Figure 10:
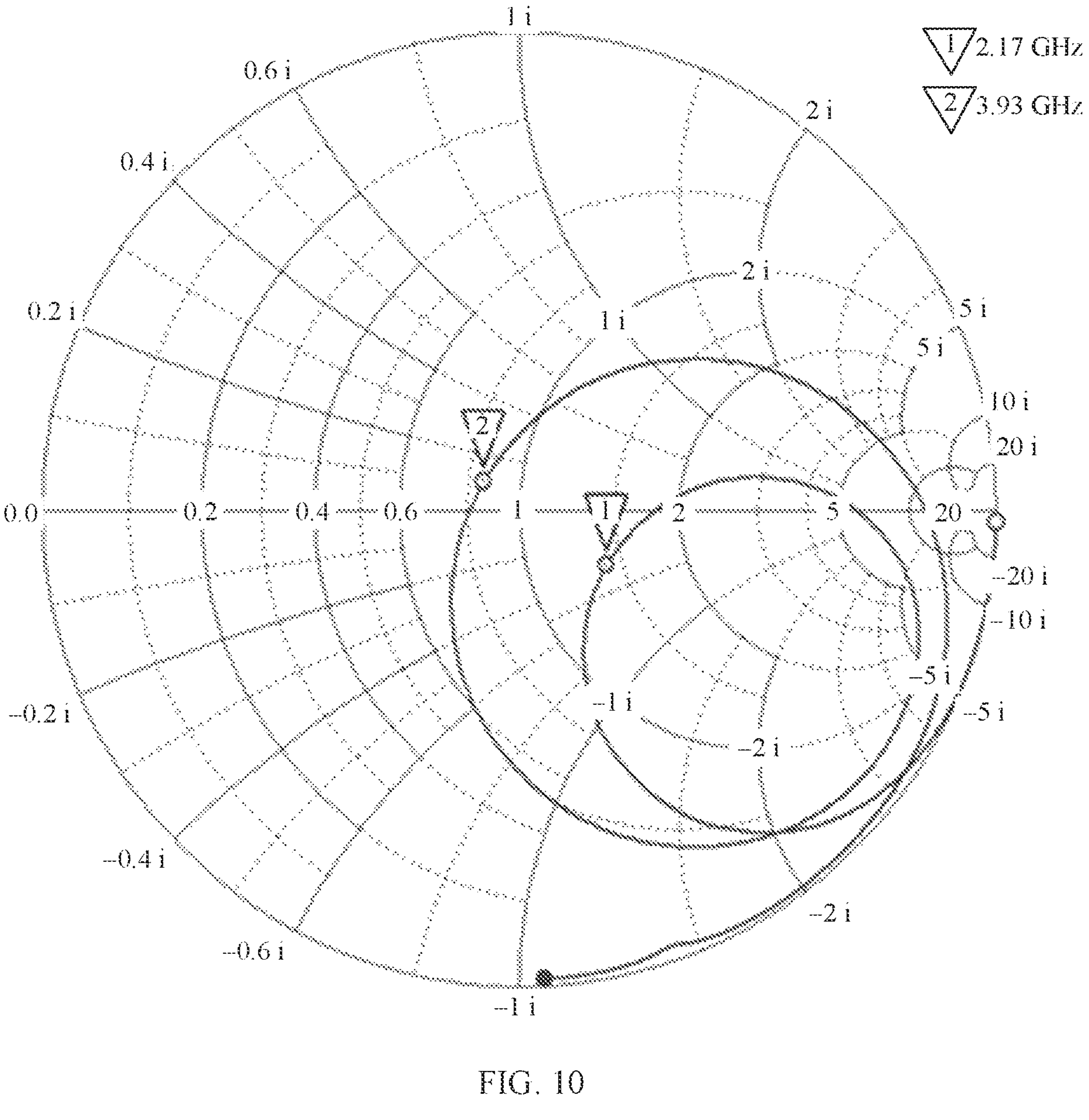
FIG. 10 is a smith (smith) simulation result diagram of the antenna structure shown in FIG. 7.

FIG. 9 and FIG. 10 are schematic diagrams of simulation results of the antenna structure shown in FIG. 7. FIG. 9 is an S-parameter simulation result diagram of the antenna structure shown in FIG. 7. FIG. 10 is a smith (smith) simulation result diagram of the antenna structure shown in FIG. 7.

As shown in FIG. 9, the antenna structure generates resonances at frequencies 2.17 GHz and 3.93 GHz respectively, and the resonances are respectively corresponding to a half-wavelength mode and a one-time wavelength mode of the antenna structure, so that the antenna structure can generate a plurality of resonances.

As shown in FIG. 10, good matching can be achieved between the half-wavelength mode and the one-time wavelength mode of the antenna structure due to disposing of a circuit.

It should be understood that, for an antenna structure in which no circuit is added, a current path of a half-wavelength mode of the antenna structure is a capacitor connected in series, a feeding position is a large electric field, a current path of a one-time wavelength mode is a capacitor connected in parallel, and a feeding position is a large current. According to the circuit provided in this embodiment of this application, a boundary condition corresponding to the (N−½) wavelength mode and/or the N-time wavelength mode is changed, so that the boundary conditions of the two modes are the same, for example, both are high impedance, or both are low impedance, and both can be excited. Therefore, according to the circuit provided in this application, the antenna structure can match the half-wavelength mode and the one-time wavelength mode, to generate a plurality of resonances.

Figure 11:
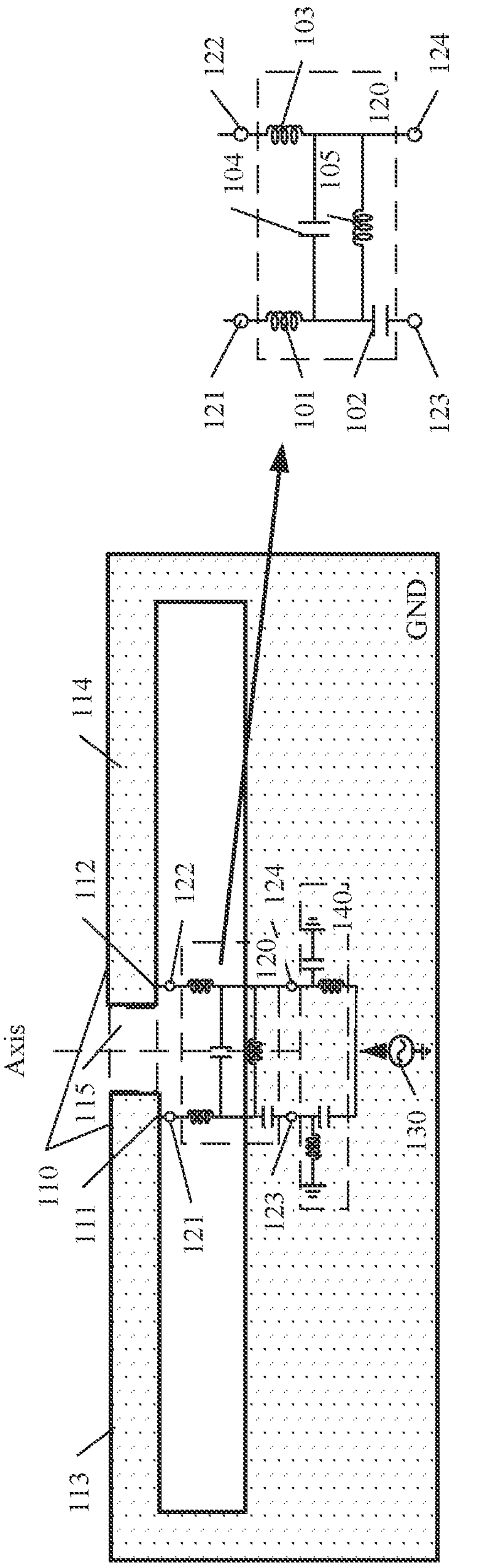
FIG. 11 is a schematic diagram of a structure of an antenna structure according to an embodiment of this application.

FIG. 11 is a schematic diagram of an antenna structure according to an embodiment of this application.

As shown in FIG. 11, the antenna structure may include an antenna radiator 110, a first circuit 120, and a feeding element 130.

Electrical lengths of antenna radiators on left and right of a virtual axis (which referred to as a "virtual axis" below) are the same. It should be understood that, in engineering application, antenna structures may not be completely the same due to internal layout of an electronic device. It may be considered that an error range of the electrical lengths of the antenna radiators on the left and right of the axis is within one-sixteenth of an operating wavelength, and "same electrical lengths" in this application is met. The antenna radiator 110 may include a first feeding point 111 and a second feeding point 112. The first feeding point 111 and the second feeding point 112 are respectively disposed on two sides of the axis, and the first feeding point 111 and the second feeding point 112 are symmetrical along the axis. The first circuit 120 includes a first port 121, a second port 122, a third port 123, and a fourth port 124. The first port 121 and the second port 122 are output ports, and the third port 123 and the fourth port 124 are input ports. The first port 121 is electrically connected to the antenna radiator 110 at the first feeding point 111, and the second port 122 is electrically connected to the antenna radiator 110 at the second feeding point 112. The feeding element 130 is electrically connected to the third port 123 and the fourth port 124. The feeding element 130 performs feeding to the antenna structure via anti-symmetrical feed. For example, signal amplitudes of electrical signals of the feeding element 130 at the third port 123 and the fourth port 124 are the same, and phases are opposite (for example, opposite phase may be a phase difference of 180°±10°).

It should be understood that the electrical length may be represented by multiplying a physical length (that is, a mechanical length or a geometric length) by a ratio of a transmission time of an electrical or electromagnetic signal in a medium to a time required when the signal passes through a distance the same as the physical length of the medium in free space. The electrical length may meet the following formula:

$$\bar{L}=L\times a/b.$$

L is the physical length, a is the transmission time of an electrical or electromagnetic signal in a medium, and b is the transmission time in free space.

Alternatively, the electrical length may be a ratio of a physical length (that is, a mechanical length or a geometric length) to a wavelength of a transmitted electromagnetic wave, and the electrical length may meet the following formula:

$$\bar{L}=L/\lambda.$$

L is the physical length, and λ is the wavelength of the electromagnetic wave.

In an embodiment, the axis of the antenna radiator may be a virtual symmetry axis of the antenna radiator 110, and the antenna radiator is symmetrical to left and right along the axis.

In an embodiment, the first port 121 of the first circuit 120 is electrically connected to the antenna radiator 110 at the first feeding point 111 via a metal spring, and the second port 122 is electrically connected to the antenna radiator 110 at the second feeding point 112 via a metal spring.

In an embodiment, the antenna structure may be a slot antenna. The antenna radiator 110 may include a first radiator 113 and a second radiator 114. A first end of the first radiator 113 and a first end of the second radiator 114 are opposite and do not contact each other. A slot 115 is formed between the first end of the first radiator 113 and the first end of the second radiator 114, and a second end of the first radiator 113 and a second end of the second radiator 114 may be electrically connected to a ground (ground, GND). For example, the second end of the first radiator 113 is connected to the ground in a main extension direction of the first radiator 113, and/or the second end of the second radiator 114 is connected to the ground in a main extension direction of the second radiator 114. For another example, the second end of the first radiator 113 is connected to the ground in a direction (different from a main extension direction) in which the first radiator 113 is bent, and/or the second end of the second radiator 114 is connected to the ground in a direction (different from a main extension direction) in which the second radiator 114 is bent. It should be understood that the ground may be a metal layer, a housing, or another metal layer in a PCB of the electronic device.

In an embodiment, the first circuit 120 may include a first capacitor 102 and a second capacitor 104. The first capacitor 102 is connected in series between the first port 121 and the third port 123, or the first capacitor 102 is connected in series between a radio frequency channel formed between the first port 121 and the third port 123, and is configured to match an (L−½) wavelength mode of the antenna structure, where L is a positive integer. A first end of the second capacitor 104 is disposed between the first capacitor 102 and the first port 121, and a second end is disposed between the second port 122 and the fourth port 123. Alternatively, the second capacitor 104 is connected in parallel between the radio frequency channel formed between the first port 121 and the third port 123 and a radio frequency channel formed between the second port 122 and the fourth port 124, and is configured to match an M-time wavelength mode of the antenna structure, where M is a positive integer.

In an embodiment, a capacitance value of the first capacitor 102 may be less than 2 pF, and a capacitance value of the second capacitor may be less than 4 pF, which may be adjusted according to an actual design or production requirement.

It should be understood that, via the second capacitor 104 connected in parallel and the first capacitor 102 connected in series in the first circuit 120, a current corresponding to the (L−½) wavelength mode and a current in the M-time wavelength mode respectively go through different paths (for example, paths through the first capacitor 102, and the second capacitor 104, respectively) to implement the matching of the two modes. For example, a boundary condition corresponding to the (L−½) wavelength mode is the same as a boundary condition corresponding to the M-time wavelength mode, and may be respectively matched with the (L−½) wavelength mode and the M-time wavelength mode. A same boundary condition may be considered as a same impedance corresponding to the antenna modes. Therefore, matching of the two modes can be implemented. The antenna structure shown in FIG. 11 may generate at least one first resonance via the first capacitor 102 connected in series in the first circuit 120. The antenna structure shown in FIG. 11 may generate at least one second resonance frequency via the second capacitor 104 connected in parallel in the first circuit 120, to expand an operating bandwidth of the antenna structure. The first resonance may correspond to the (L−½) wavelength mode of the antenna structure, and the first capacitor 102 may be configured to match the (L−½) wavelength mode of the antenna structure. The second resonance may correspond to the M-time wavelength mode of the antenna structure, and the second capacitor 104 may be configured to match the M-time wavelength mode of the antenna structure.

In an embodiment, the first circuit 120 may include a first inductor 101, a second inductor 103, and a third inductor 105. The first inductor 101 is connected in series between the first end of the second capacitor 104 and the first port 121, and the second inductor 103 is connected in series between the second end of the second capacitor 104 and the second port 122. The first inductor 101 and the second inductor 103 may be configured to adjust a resonance frequency of the M-time wavelength mode. One end, of the third inductor 105 is disposed between the first end of the second capacitor 104 and the first capacitor 102, and the other end is disposed between the second end of the second capacitor 104 and the fourth port 124. The third inductor 105 may be configured to adjust a resonance frequency of the (L−½) wavelength mode.

In an embodiment, the antenna structure may further include an anti-symmetrical network 140. The anti-symmetrical network 140 is located between the first circuit 120 and the feeding element 130, and is configured to connect the third port 123 and the fourth port 124 of the first circuit 120 to the feeding element 130. In this way, the electrical signal of the feeding element 130 has a same amplitude but opposite phases at the third port 123 and the fourth port 124.

It should be understood that the anti-symmetrical network 140 is merely a technical means for implementing opposite phases of the electrical signals of the feeding element 130 between the third port 123 and the fourth port 124, and opposite phases may also be implemented via other technical means in actual production or design. For example, a balun, and/or a 1800 coupler, and/or a combination of a 90° coupler and a phase shift network, and the like. This is not limited in this application.

Figure 12:
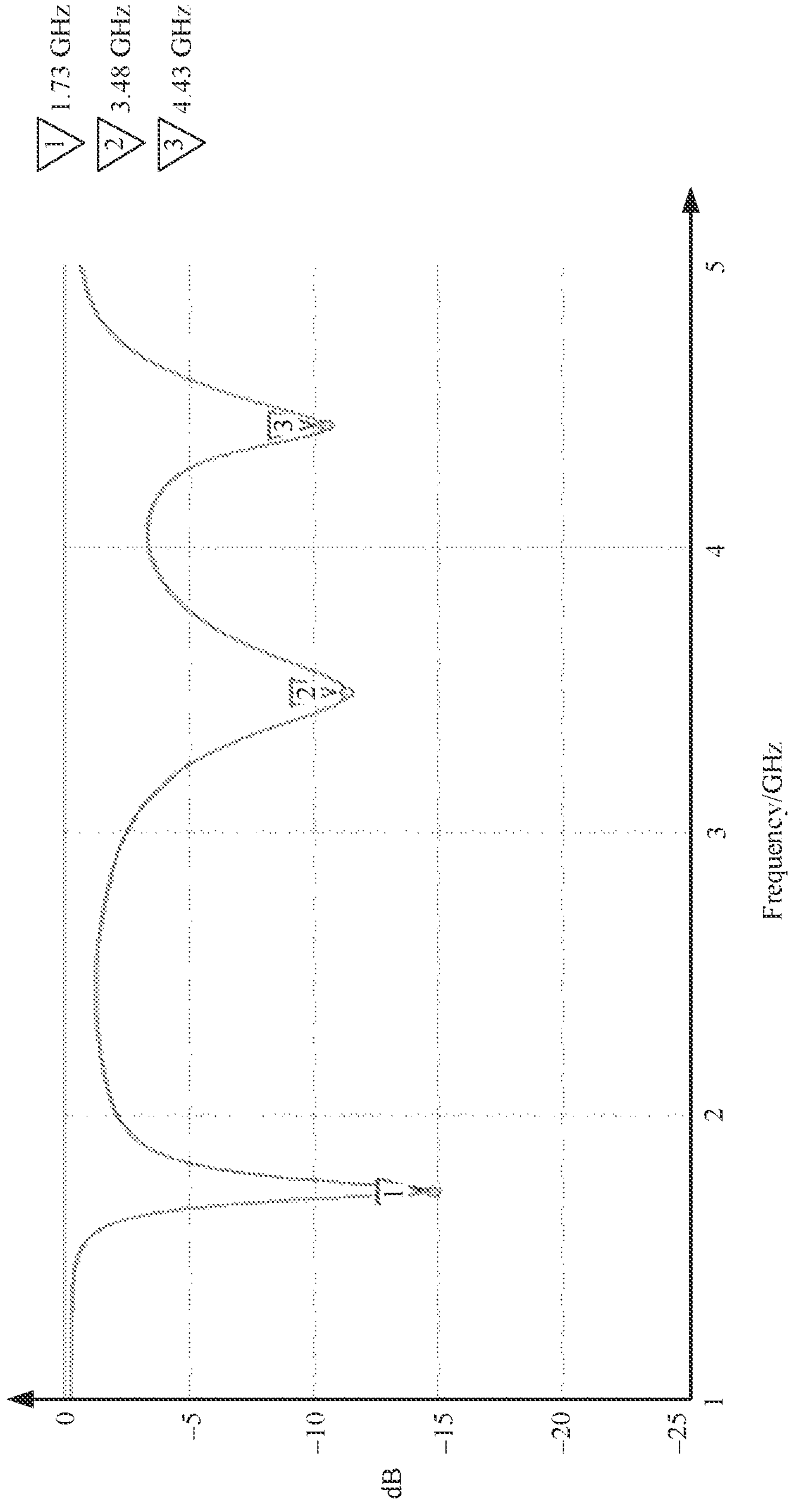
FIG. 12 is an S-parameter simulation result diagram of the antenna structure shown in FIG. 11.
Figure 13:
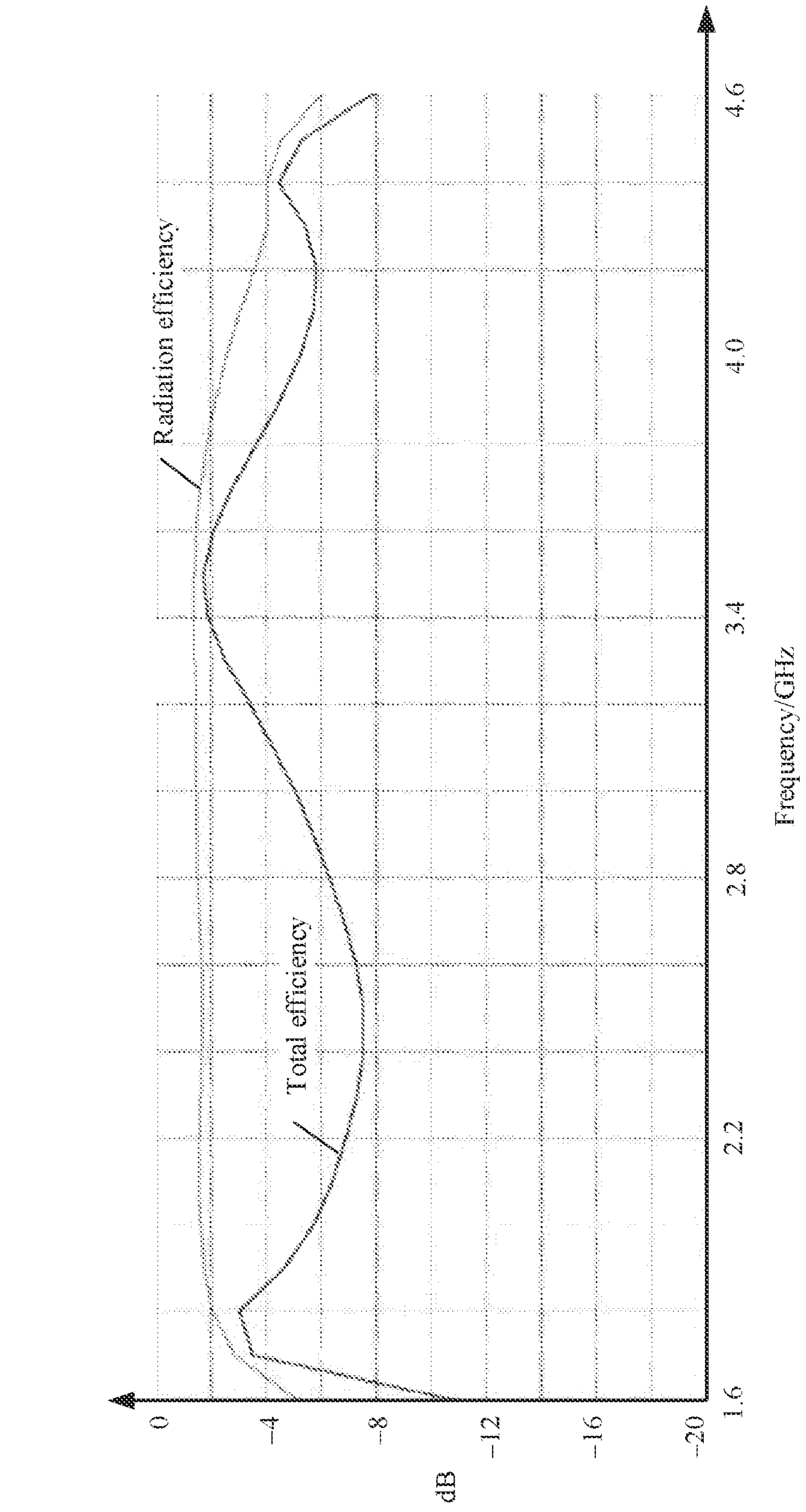
FIG. 13 is a diagram of simulation results of radiation efficiency and total efficiency of the antenna structure shown in FIG. 11.
Figure 14:
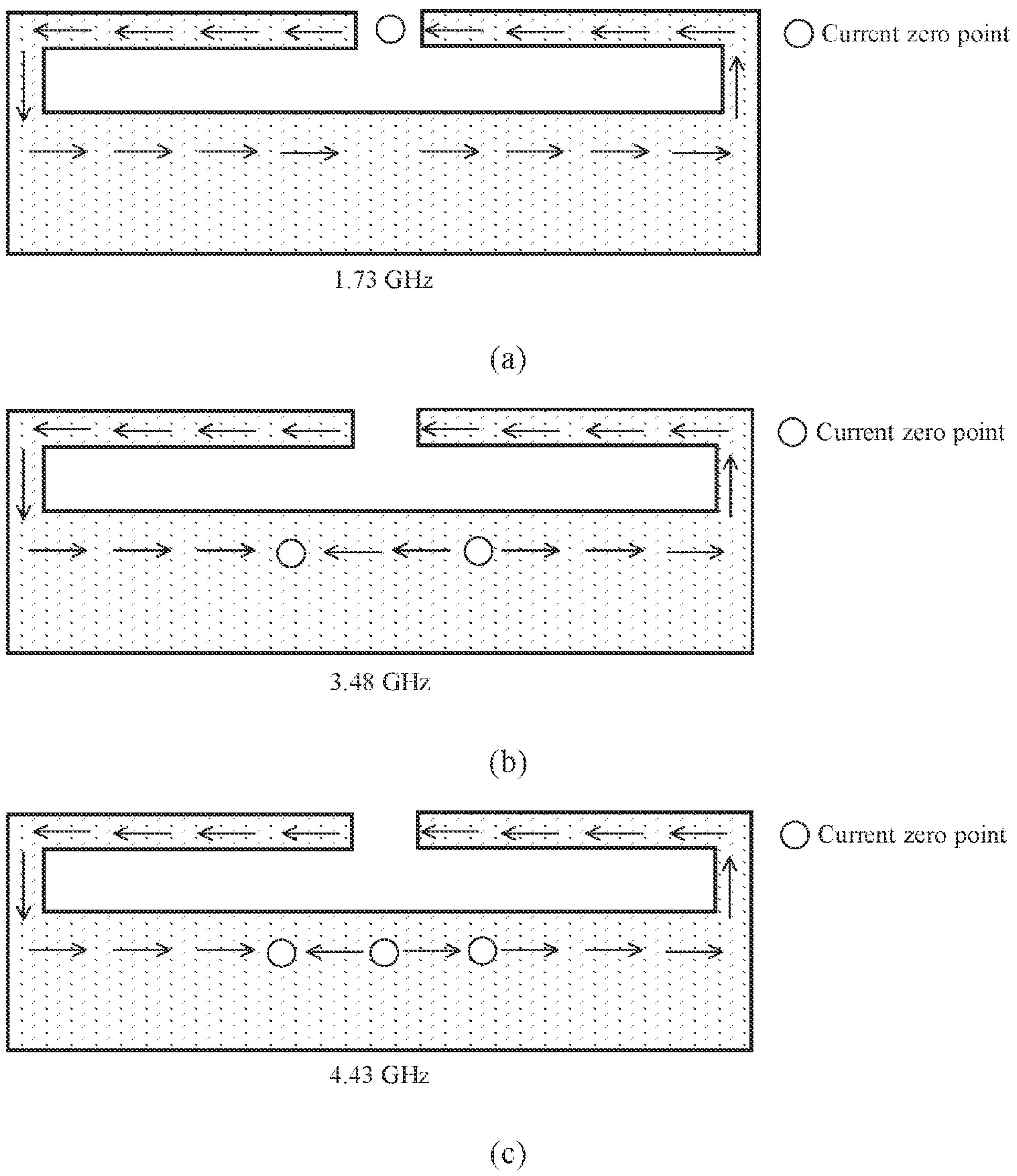
FIG. 14 is a schematic diagram of current distribution at resonance points of the antenna structure shown in FIG. 11.

FIG. 12 to FIG. 14 are schematic diagrams of simulation structures of the antenna structure shown in FIG. 11. FIG. 12, is an S-parameter simulation result diagram of the antenna structure shown in FIG. 11. FIG. 13 is a diagram of simulation results of radiation efficiency (radiation efficiency) and total efficiency (total efficiency) of the antenna structure shown in FIG. 11. FIG. 14 is a schematic diagram of current distribution at resonance points of the antenna structure shown in FIG. 11.

As shown in FIG. 12, when a feeding element operates, the antenna structure generates three resonances, and resonance points of the antenna structure are respectively 1.73 GHz, 3.48 GHz, and 4.43 GHz, where 1.73 GHz corresponds to a half-wavelength mode of the antenna structure. 3.48 GHz corresponds to a one-time wavelength mode of the antenna structure, and 4.43 GHz corresponds to a three-half wavelength mode of the antenna structure.

In an embodiment, operating frequency bands of the antenna structure may respectively cover a high frequency band in long term evolution (long term evolution, LTE), for example, 1700 MHz to 2700 MHz, an N77 (3.3 GHz to 4.2 GHz) frequency band and N79 (4.4 GHz to 5.0 GHz) frequency band in a 5G frequency band. It should be understood that parameters in the antenna structure may also be adjusted, so that the operating frequency bands cover other frequency bands. This application is merely an example, and the operating frequency bands of the antenna structure are not limited.

As shown in FIG. 13, in an operating frequency band corresponding to resonance generated by the antenna structure, radiation efficiency is greater than −4 dB, and total efficiency is greater than −8 dB, which may also meet a requirement.

As shown in (a) in FIG. 14, when the antenna structure operates at 1.73 GHz, currents of the antenna structure face a same direction, and there is a current zero point. It should be understood that the antenna structure shown in FIG. 11 is equivalent to a folded electric dipole antenna. For the electric dipole antenna, the current zero point exists at two ends of the radiator. After the radiator is folded to be the antenna structure shown in FIG. 11, the current zero point is located at a slot. When the current on the radiator of the electric dipole antenna is in the same direction, the current zero point corresponds to the half-wavelength mode. Therefore, the current distribution shown in (a) in FIG. 14 corresponds to the half-wavelength mode. As shown in (b) in FIG. 14, when the antenna structure operates at 3.48 GHz, there are two current zero points, which are twice that of the antenna structure shown in (a) in FIG. 14. Therefore, the two current zero points correspond to the one-time wavelength mode. As shown in (c) in FIG. 14, when the antenna structure operates at 4.43 GHz, there are three current zero points. Therefore, the three current zero points correspond to the three-half wavelength mode. Herein, (a), (b), and (c) in FIG. 14 respectively show that the slot antenna operates in the ½ wavelength mode, the one-time wavelength mode, and the ⅔ wavelength mode. It should be understood that: A ½ wavelength mode, a one-time wavelength mode, and ⅔ wavelength mode of a wire antenna are also similar, for example, having 1, 2 and 3 current zero points, respectively. Similarly, it can be learned that the antenna structure has (N−½)/(½) current zero points in the (N−½) wavelength mode, and has N/(½) current zero points in the N wavelength mode. It should be understood that the current on the radiator is an alternating current, and the current zero point is a current reverse point on the radiator. The operating mode of the antenna structure may be determined via the current zero point on the radiator, to determine that the antenna structure is in an (L−½) wavelength mode or an M-time wavelength mode. In addition, due to different antenna structures, a corresponding current zero point may not be on the antenna radiator, but is at a slot formed by the radiator or at a feeding position. This is not limited in this application, and may be determined based on an actual antenna structure.

Therefore, because the antenna structure includes the first circuit, boundary conditions corresponding to the (L−½) wavelength mode and the M-time wavelength mode are changed via the first circuit, so that the boundary conditions of the (L−½) wavelength mode and the M-time wavelength mode are the same, and simultaneous excitation can be performed. In this case, good matching can be implemented between the (L−½) wavelength mode and the M-time wavelength mode of the antenna structure, and a plurality of resonances can be generated in the antenna structure, so that an operating frequency band of the antenna structure can be expanded.

It should be understood that, for the antenna structure shown in FIG. 11, a basic form of the antenna structure is a CM slot antenna. By adding the first circuit, the half-wavelength mode, the one-time wavelength mode, and the three-half wavelength mode of the slot antenna in a CM mode are excited. For other antenna forms, such as a wire antenna (for example, a CM mode, a DM mode of the wire antenna), an open slot antenna (for example, a CM mode and a DM mode of the open slot antenna), the (L−½) wavelength mode and the M-time wavelength mode of the antenna may also be excited by adding the first circuit.

Figure 15:
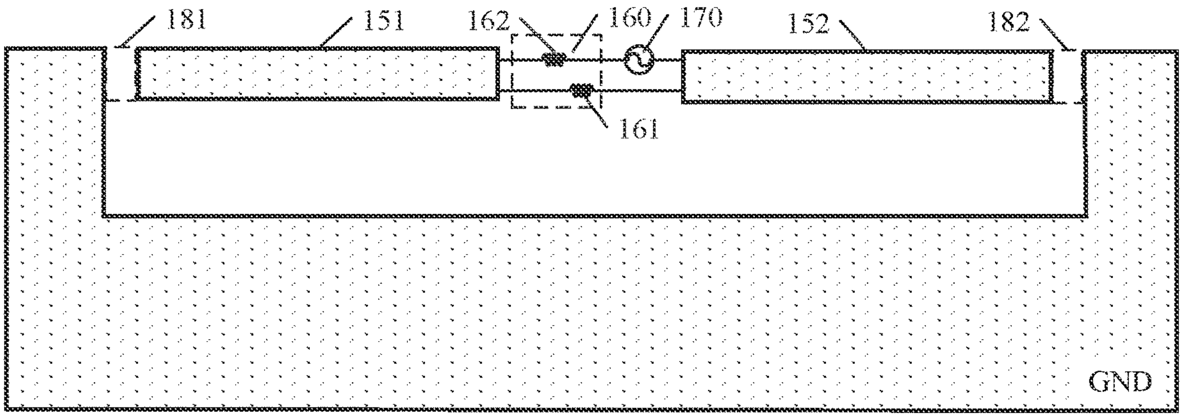
FIG. 15 is a schematic diagram of a slot antenna whose two ends are open according to an embodiment of this application.

FIG. 15 is a schematic diagram of a slot antenna whose two ends are open according to an embodiment of this application.

FIG. 15 is a schematic diagram of a structure of a slot antenna whose two ends are open. A first circuit of the slot antenna is different from the slot antenna shown in FIG. 11. It is because that an initial impedance of the antenna structure starts from a circuit break point, and an initial circle impedance of the slot antenna shown in FIG. 11 starts from a short-circuit point. Therefore, the first circuit corresponds to the initial circle impedance of the antenna structure. For example, when the initial circle impedance starts from the short-circuit point, the first circuit may select a parallel capacitor and a series capacitor solution, and when the initial circle impedance starts from the circuit break point, the first circuit may select a parallel inductor and a series inductor solution.

It should be understood that, the slot antenna whose two ends are open may be considered that two ends of a radiator of the slot antenna are open, and is not directly connected to another conductor (for example, a ground or another metal mechanical part). For example, in an electronic device, a section of a metal frame is used as the radiator of the slot antenna, and two ends of the radiator are open. It may be considered that two ends of the radiator respectively form a slot with the metal frame, and are not directly connected to the metal frame. The slot formed by the two ends of the radiator with the metal frame may be filled with a dielectric, to meet a strength requirement of the electronic device. At the same time, the two ends of the radiator are open to form a slot antenna whose two ends are open.

As shown in FIG. 15, the antenna radiator may include a first radiator 151 and a second radiator 152. A slot 181 may be formed between an end that is of the first radiator 151 away from the second radiator 152 and a ground, and a slot 182 may be formed between an end that is of the second radiator 152 away from the first radiator 151 and the ground. A first circuit 160 and a feeding element 170 may be disposed between the first radiator 151 and the second radiator 152, and two feeding points that are electrically connected between the feeding element and the first radiator 151 and the second radiator 152 may be symmetrical along a virtual axis of the antenna radiator. An inductor 161 connected in parallel in the first circuit 160 may be configured to match an (L−½) wavelength mode, and an inductor 162 connected in series may be configured to match an M-time wavelength mode.

In an embodiment, the slot 181 may be formed between the end of the first radiator 151 that is away from the second radiator 152 and a section of a first electric-conductor, and the slot 182 may be formed between the end of the second radiator 152 that is away from the first radiator 151 and a section of a second electric-conductor.

For brevity of description, in this application, an example in which the first electric-conductor and the second electric-conductor are only a part of the ground is used. This is not limited in this application. In another embodiment of this application, the first electric-conductor and the second electric-conductor may be respectively electrically connected to the ground at first ends of the first electric-conductor and the second electric-conductor. For example, the first electric-conductor and the second electric-conductor are used as radiators of other antenna structures. It should be understood that, an electrical connection of the first end to the ground includes an electrical connection to the ground at the end, and also includes an electrical connection to the ground at a ground point on an electric-conductor near the end.

In an embodiment, a positive electrode of the feeding element 170 is connected to the first radiator 151, and a negative electrode of the feeding element is connected to the second radiator 152. In this case, the antenna structure operates in a CM mode.

In an embodiment, an inductance value of the inductor 161 may be less than 15 nH, and an inductance value of the inductor 162 may be less than 10 nH, which may be adjusted according to an actual design or production requirement.

Figure 16:
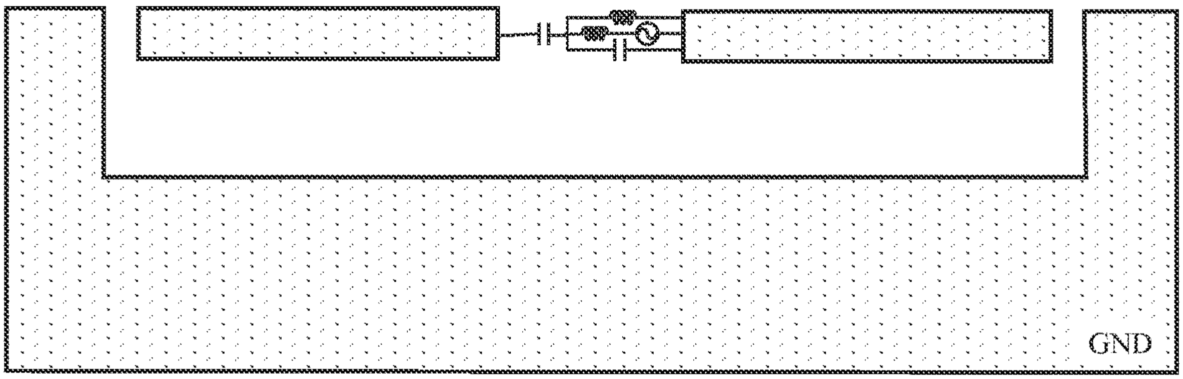
FIG. 16 is another schematic diagram of a slot antenna whose two ends are open according to an embodiment of this application.

It should be understood that the first circuit is configured to make a current path of the (L−½) wavelength mode different from a current path of the M-time wavelength mode, to separately match the (L−½) wavelength mode and the M-time wavelength mode. In addition, an electronic component may also be added on the first circuit 160 shown in FIG. 15, and an equivalent electrical length of the radiator may be changed, to implement fine-tuning of a resonance frequency, as shown in FIG. 16. This is not limited in this application, and may be adjusted according to actual production or design.

In the foregoing embodiment, the first circuit is added to the antenna structure, and at least one (L−½) wavelength mode and at least one M-time wavelength mode are excited, for example, a half-wavelength mode, a one-time wavelength mode, and a three-half wavelength mode are excited. If a DM mode feed is added on this basis, the half-wavelength mode, one-time wavelength mode, and three-half wavelength mode of the CM mode, and the half-wavelength mode, one-time wavelength mode, and three-half wavelength mode of the DM mode may be generated together. It should be understood that, because electric fields corresponding to the CM mode and the DM mode are integrally orthogonal in a far field, integral orthogonality may be understood as that an electric field that generates resonance in the CM mode and the DM mode meets the following formula in the far field:

$$\iint E_1(\theta,\varphi)\cdot E_2(\theta,\varphi)d\theta d\varphi=0.$$

$E_1(\theta,\varphi)$ is an electric field of a far field corresponding to a resonance generated in the CM mode, and $E_2(\theta,\varphi)$ is an electric field of a far field corresponding to a resonance generated in the DM mode. In a three-dimensional coordinate system, θ is an angle with a z axis, and D is an angle with an x axis on an xoy plane. The electric fields corresponding to the resonance generated in the CM mode and the DM mode are integrally orthogonal between the far fields, and do not affect each other. Therefore, when the antenna structure operates in the CM mode and the DM mode, at least one (L−½) wavelength mode and at least one M-time wavelength mode in the CM mode can be generated, and at least one (L−½) wavelength mode and at least one M-time wavelength mode in the DM mode can be generated while maintaining high isolation. For example, a first resonance frequency of the CM mode and a first resonance frequency of the DM mode may be in the same frequency and have high isolation. The same frequency may be understood as being in a same frequency band.

Figure 17:
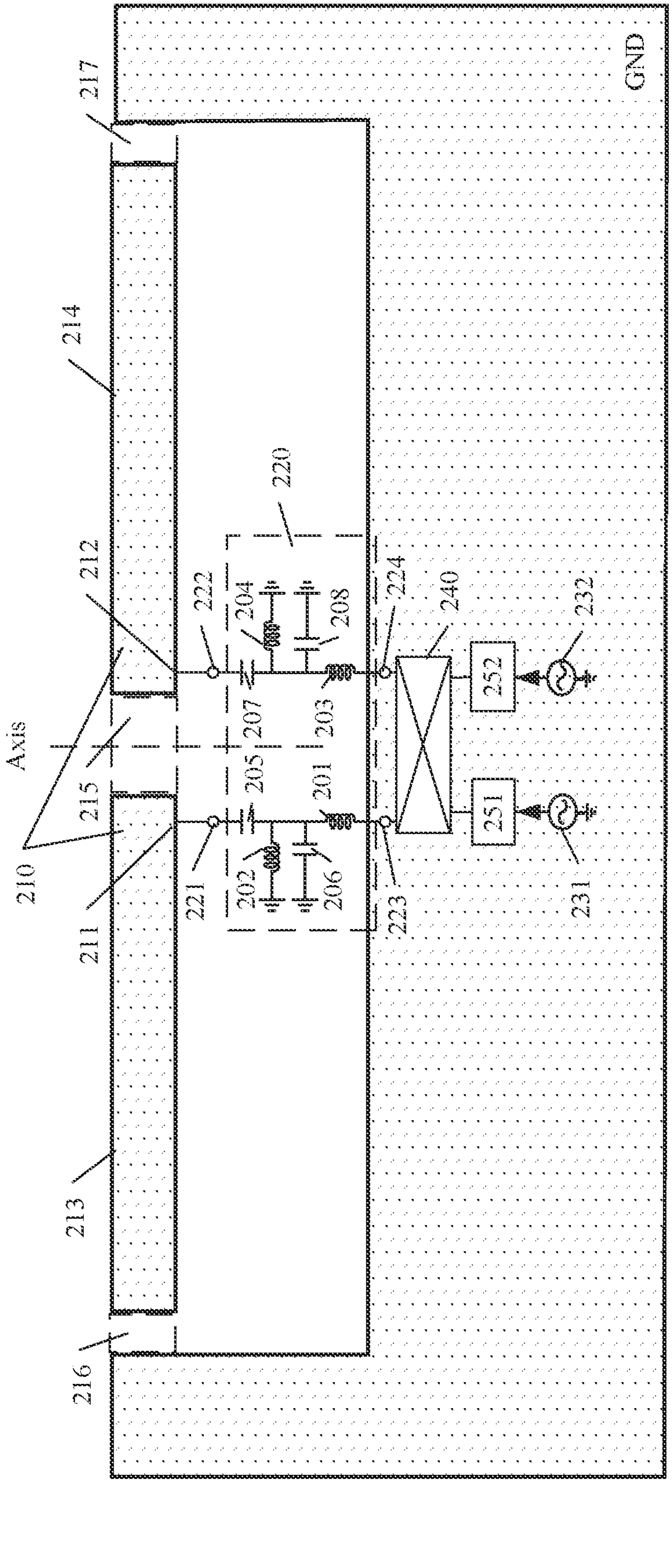
FIG. 17 is a schematic diagram of an antenna structure according to an embodiment of this application.

FIG. 17 is a schematic diagram of an antenna structure according to an embodiment of this application.

As shown in FIG. 17, the antenna structure may include an antenna radiator 210, a first circuit 220, a first feeding element 231, and a second feeding element 232.

Electrical lengths of the antenna radiator 210 on the left and right of a virtual axis are the same. It should be understood that, in engineering application, antenna structures may not be completely the same due to internal layout of an electronic device. It may be considered that an error range of the electrical lengths of the antenna radiator on the left and right of the axis is within a one-sixteenth operating wavelength, and "same electrical lengths" in this application is met. The antenna radiator 210 includes a first feeding point 231 and a second feeding point 232. The first feeding point 231 and the second feeding point 232 are respectively disposed on two sides of the axis of the antenna radiator 210, and the first feeding point 231 and the second feeding point 232 are symmetrical along the axis. The first circuit 220 includes a first port 221, a second port 222, a third port 223, and a fourth port 224. The first port 221 and the second port 222 are output ports, and the third port 223 and the fourth port 224 are input ports. The first port 221 is electrically connected to the antenna radiator 210 at the first feeding point 211, and the second port 222 is electrically connected to the antenna radiator 210 at the second feeding point 212. The first feeding element 231 is electrically connected to the third port 223 and the fourth port 224, and feeds to the antenna structure via symmetrical feed. For the symmetrical feed, for example, signal amplitudes and phases of electrical signals of the first feeding element 231 between the third port 223 and the fourth port 224 are the same. The second feeding element 232 is electrically connected to the third port 223 and the fourth port 224, and feeds to the antenna structure via anti-symmetrical feed. For the anti-symmetrical feed, for example, signal amplitudes of electrical signals of the second feeding element 232 between the third port 223 and the fourth port 224 are the same, and phases are opposite (for example, a phase difference of 180°).

In an embodiment, the virtual axis of the antenna radiator may be a virtual symmetry axis of the antenna radiator 210, and the antenna radiator is symmetrical to left and right along the symmetry axis.

It should be understood that the antenna structure includes a first feeding element that uses symmetrical feed and a second feeding element that uses anti-symmetrical feed. Therefore, the CM mode and the DM mode of the antenna structure may be excited together. The antenna structure may operate in the at least one (L−½) wavelength mode and at least one M-time wavelength mode, where L and M are positive integers. The antenna structure may generate a resonant frequency band with a same frequency and high isolation, to meet a requirement of communication for a bandwidth and isolation.

At the same time, for a first antenna unit formed between the first feeding element 231 and the antenna radiator 210 and a second antenna unit formed between the second feeding element 232 and the antenna radiator 210, the two antenna units multiplex a same antenna radiator (for example, a first radiator 213 and a second radiator 214 shown in the figure), space occupied by the antenna unit can be greatly reduced.

In an embodiment, the first port 221 of the first circuit 220 is electrically connected to the antenna radiator 210 at the first feeding point 211 via a metal spring, and the second port 222 is electrically connected to the antenna radiator 210 at the second feeding point 212 via a metal spring.

In an embodiment, the antenna structure may be a slot antenna whose two ends are open. It may be understood that two ends of the radiator of the slot antenna are open and are not directly connected to a ground, another electric-conductor, or the like. The antenna radiator 210 may include the first radiator 213 and the second radiator 214. The first radiator 213 and the second radiator 214 may be respectively disposed on two sides of a virtual axis, and electrical lengths of the first radiator 213 and the second radiator 214 are equal. A first end of the first radiator 213 and a first end of the second radiator 214 are opposite and do not contact each other, and a slot 215 is formed between the first end of the first radiator 213 and the first end of the second radiator 214. A slot 216 is formed between a second end of the first radiator 213 and the ground, and a slot 217 is formed between a second end of the second radiator 214 and the ground. It should be understood that the ground may be a metal layer, a housing, or another metal layer in a PCB of the electronic device.

In an embodiment, the slot 216 may be formed between the second end of the first radiator 213 and a first electric-conductor, and the slot 217 may be formed between the second end of the second radiator 214 and a second electric-conductor. Alternatively, a first dielectric is disposed at the second end of the first radiator 213, to implement "open" of the second end of the first radiator 213. Similarly, a second dielectric may be disposed at the second end of the second radiator 214 to implement "open" of the second end of the second radiator 214.

In an embodiment, the first circuit 220 may further include a first inductor 201, a second inductor 202, a third inductor 203, and a fourth inductor 204. The first inductor 201 is connected in series between the first port 221 and the third port 223, the third inductor 203 is connected in series between the second port 222 and the fourth port 224, and the first inductor 201 and the third inductor 203 may be configured to match an N-time wavelength mode of the antenna structure. The second inductor 202 is connected in parallel between the first inductor 201 and the first port 221 and is grounded, the fourth inductor 204 is connected in parallel between the third inductor 203 and the second port 222 and is grounded, and the second inductor 202 and the fourth inductor 204 may be configured to match the (N−½) wavelength mode of the antenna structure.

It should be understood that an inductor is connected in series and parallel between an input port and an output port of the first circuit in the antenna structure shown in FIG. 17. For example, an inductor is connected in parallel and in series in a radio frequency channel formed between the first port 221 and the third port 223 in sequence. A current corresponding to the (L−½) wavelength mode and a current corresponding to the M-time wavelength mode go separately through different paths, to separately implement matching between the two modes. For example, a boundary condition corresponding to the (L−½) wavelength mode is the same as a boundary condition corresponding to the M-time wavelength mode, and may be respectively matched with the (L−½) wavelength mode and the M-time wavelength mode. A same boundary condition may be considered as a same impedance corresponding to the antenna modes. Therefore, matching of the two modes can be implemented. The antenna structure shown in FIG. 17 may generate at least one first resonance via the second inductor 202 and the fourth inductor 204 in the first circuit 220. The antenna structure shown in FIG. 17 may generate at least one second resonance via the first inductor 201 and the third inductor 203 in the first circuit 220, to expand an operating bandwidth of the antenna structure. The first resonance may correspond to the (L−½) wavelength mode of the antenna structure, and the second inductor 202 and the fourth inductor 204 may be configured to match the (L−½) wavelength mode of the antenna structure. The second resonance may correspond to the M-time wavelength mode of the antenna structure, and the first inductor 201 and the third inductor 203 may be configured to match the M-time wavelength mode of the antenna structure.

In an embodiment, an electronic component disposed between the first port 221 and the third port 223 and an electronic component disposed between the second port 222 and the fourth port 224 are symmetrical to each other. For example, the first inductor 201 and the third inductor 203 are symmetrical to each other, and inductance values are the same. The second inductor 202 and the fourth inductor 204 are symmetrical to each other, and inductance values are the same.

In an embodiment, the first circuit 220 may include a first capacitor 205, a second capacitor 206, a third capacitor 207, and a fourth capacitor 208. The first capacitor 205 is connected in series between the second inductor 202 and the first port 221, and the third capacitor 207 is connected in series between the second port 222 and the fourth inductor 204. The first capacitor 205 and the third capacitor 207 may be configured to adjust a resonance frequency of the M-time wavelength mode. The second capacitor 206 is connected in parallel between the first inductor 201 and the second inductor 202 and is grounded, and the fourth capacitor 208 is connected in parallel between the third inductor 203 and the fourth inductor 204 and is grounded. The second capacitor 206 and the fourth capacitor 208 may be configured to adjust a resonance frequency of the (L−½) wavelength mode.

In an embodiment, the antenna structure may further include a 180° directional coupler 240 that is located between the first circuit 220 and the feeding element, for example, between the first feeding element 231, the second feeding element 121, and the third port 123 and the fourth port 124 of the first circuit 120, so that phases of electrical signals of the first feeding element 231 between the third port 223 and the fourth port 224 are the same, and phases of electrical signals of the second feeding element 232 between the third port 223 and the fourth port 224 are opposite.

It should be understood that the 180° directional coupler 240 is merely a technical means for implementing same or opposite phases of the electrical signals of the feeding element between the third port 123 and the fourth port 124, and opposite phases may also be implemented via other technical means in actual production or design. For example, a balun, and/or a 180° coupler, and/or a combination of a 90° coupler and a phase shift network, and the like. This is not limited in this application.

In an embodiment, the antenna structure may further include a first matching network 251 and a second matching network 252. The first matching network 251 is configured to adjust an impedance of the first feeding element 231, to minimize a transmission loss and distortion of an electrical signal. The second matching network 252 is configured to adjust an impedance of the second feeding element 232, to minimize a transmission loss and distortion of an electrical signal.

In an embodiment, the first matching network 251 and the second matching network 252 may be an LC network or another type of network, and may be selected according to actual production or design. This is not limited in this application.

Figure 18:
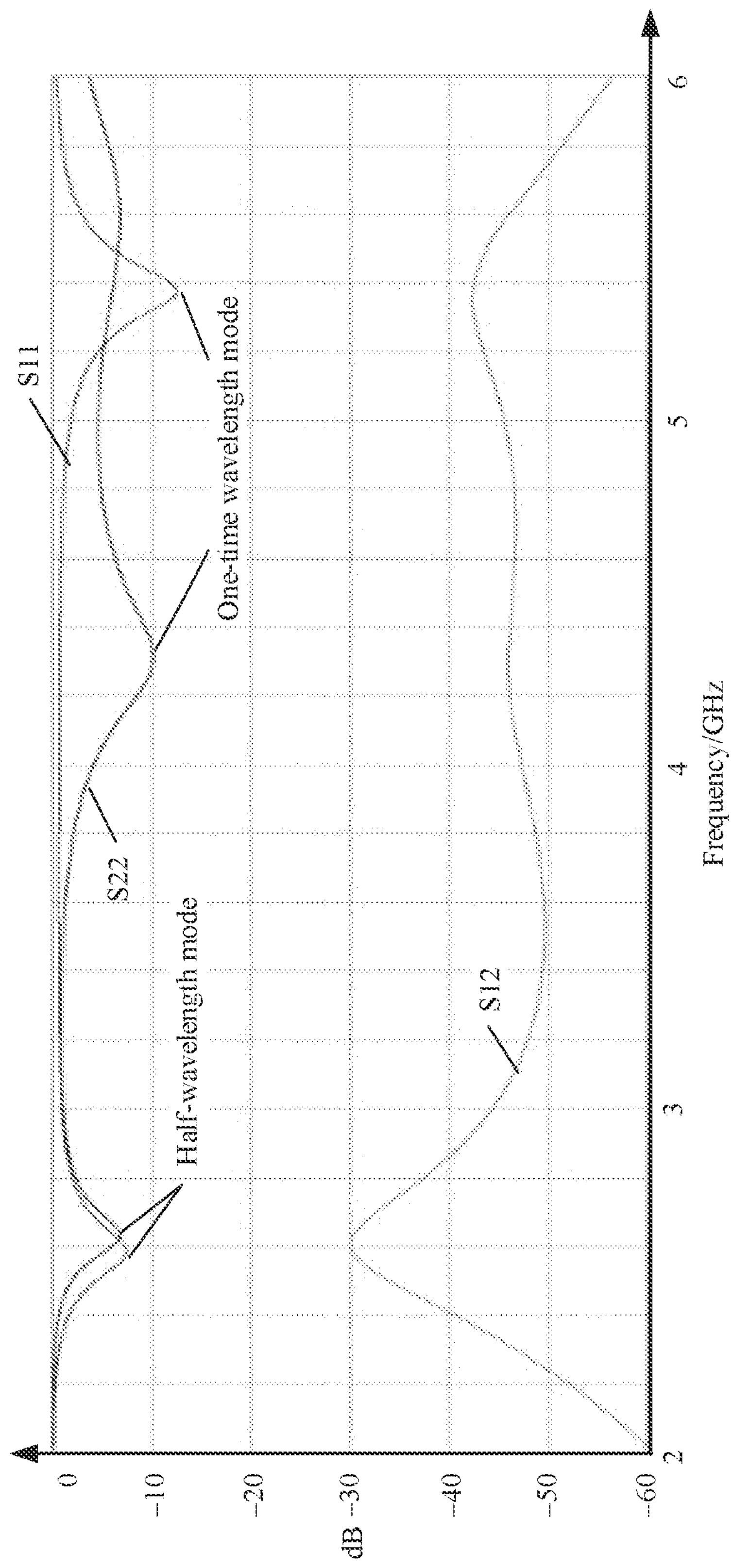
FIG. 18 is an S-parameter simulation result diagram of the antenna structure shown in FIG. 17.
Figure 19:
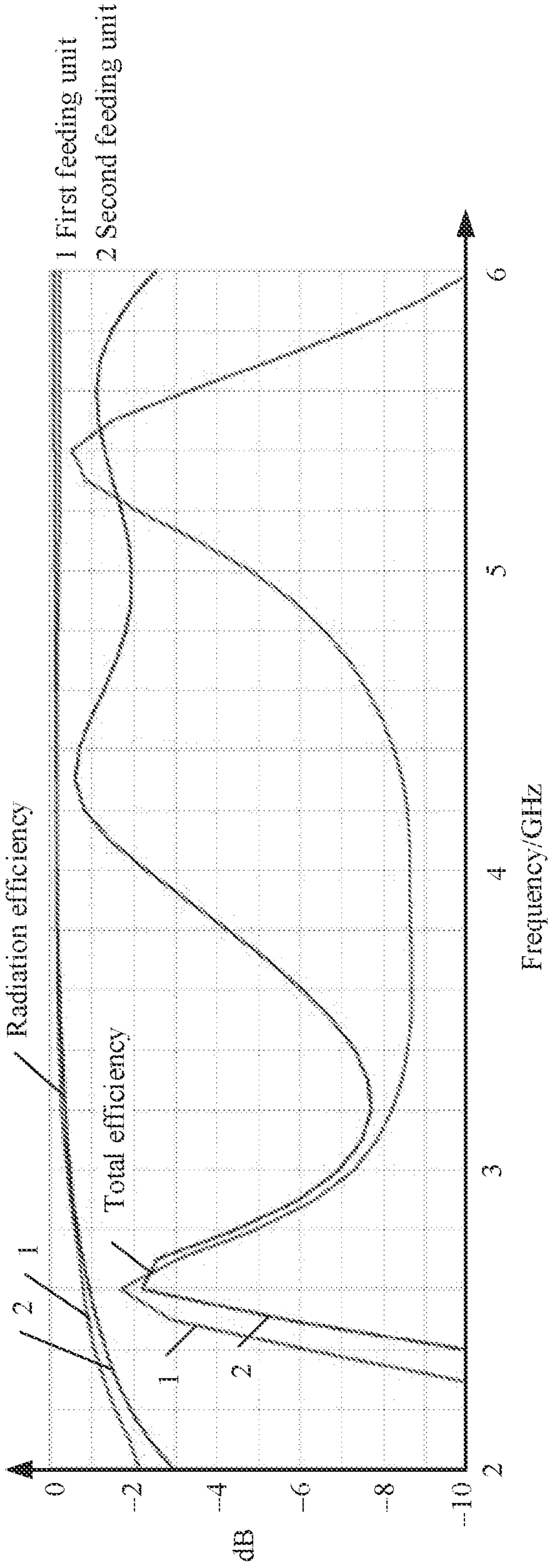
FIG. 19 is a diagram of simulation results of radiation efficiency and total efficiency of the antenna structure shown in FIG. 17.

FIG. 18 and FIG. 19 are schematic diagrams of simulation results of the antenna structure shown in FIG. 17. FIG. 18 is an S-parameter simulation result diagram of the antenna structure shown in FIG. 17. FIG. 19 is a diagram of simulation results of radiation efficiency and total efficiency of the antenna structure shown in FIG. 17.

As shown in FIG. 18, when a first feeding element feeds, an electrical signal of the first feeding element is fed into an antenna radiator through a first port and a second port. An S parameter corresponding to the antenna structure is S11. A half-wavelength mode and a one-time wavelength mode may be excited, and the antenna structure may operate in a plurality of resonant frequency bands. When a second feeding element feeds, an electrical signal of the second feeding element is fed into the antenna radiator through the first port and the second port. The S parameter corresponding to the antenna structure is S22. The half-wavelength mode and the one-time wavelength mode may also be excited, and the antenna structure may operate in a plurality of resonant frequency bands. When the operating bandwidth of the antenna structure is ensured, because the first feeding element and the second feeding element respectively excite the DM mode and the CM mode of the antenna structure, in a same frequency band, good isolation can be maintained between resonant frequency bands respectively excited by the first feeding element and the second feeding element, and a worst isolation between the two is −30 dB.

It should be understood that, for the antenna structure shown in FIG. 17, better symmetry of the structure indicates better isolation between resonant frequency bands respectively excited by the first feeding element and the second feeding element.

As shown in FIG. 19, in an operating frequency band corresponding to resonance generated by the antenna structure, radiation efficiency is greater than −3 dB, and total efficiency is greater than −6 dB, which may meet a communication requirement.

Figure 20:
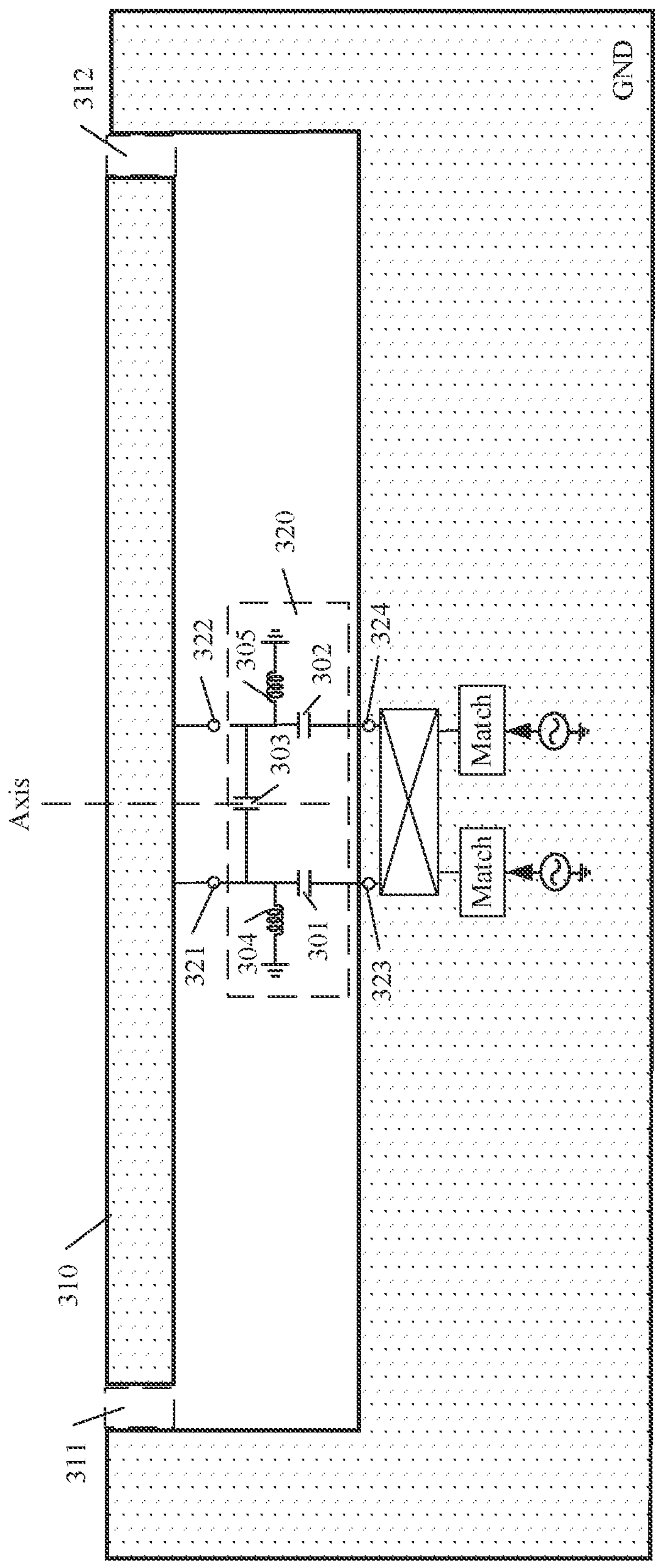
FIG. 20 is a schematic diagram of an antenna structure according to an embodiment of this application.

FIG. 20 is a schematic diagram of an antenna structure according to an embodiment of this application. Different from the antenna structure shown in FIG. 17, a radiator of the antenna structure shown in FIG. 20 is a complete metal mechanical part, and no slot is provided on the radiator. Other structures are the same. For brevity of description, details are not described one by one.

It should be understood that a first circuit provided in this embodiment of this application may be adjusted based on different antenna structures, so that the different antenna structures excite at least one (L−½) wavelength mode and at least one M-time wavelength mode.

As shown in FIG. 20, the antenna structure may be a slot antenna whose two ends are open. Structurally, two ends of a radiator of the slot antenna whose two ends are open are not connected to a ground. An antenna radiator 310 may be a complete conductor, for example, a complete metal piece. One end of the antenna radiator 310 and the ground may form a slot 311, and the other end of the antenna radiator 310 and the ground may form a slot 312. The antenna structure may operate in at least one (L−½) wavelength mode and at least one M-time wavelength mode, where L and M are positive integers.

In an embodiment, the slot 311 may be formed between a first end of the antenna radiator 310 and a first electric-conductor, and the slot 312 may be formed between a second end of the antenna radiator 310 and a second electric-conductor. Alternatively, a first dielectric is disposed at the first end of the antenna radiator 310, so that the first end of the antenna radiator 310 is “open”. Similarly, a second dielectric may be disposed at the second end of the antenna radiator 310, so that the second end of the antenna radiator 310 is “open”.

In an embodiment, the first circuit 320 may include a first capacitor 301, a second capacitor 302, and a third capacitor 303. The first capacitor 301 is connected in series between a first port 321 and a third port 323, and the second capacitor 302 is connected in series between a second port 322 and a fourth port 324. The first capacitor 301 and the second capacitor 302 may be configured to match an (N−½) wavelength mode of the antenna structure. A first end of the third capacitor 303 is disposed between the first capacitor 301 and the first port 321, and a second end is disposed between the second capacitor 302 and the second port 322. To be specific, the third capacitor 303 is connected in parallel between a radio frequency channel formed between the first port 321 and the third port 323 and a radio frequency channel formed between the second port 322 and the fourth port 324, and is configured to match an N-time wavelength mode of the antenna structure.

It should be understood that the capacitors are connected in parallel and connected in series in the first circuit 320, and the current corresponding to the (L−½) wavelength mode and the current of the M-time wavelength mode go through different paths, to separately implement matching between the two modes. For example, a boundary condition corresponding to the (L−½) wavelength mode is the same as a boundary condition corresponding to the M-time wavelength mode, and may be respectively matched with the (L−½) wavelength mode and the M-time wavelength mode. A same boundary condition may be considered as a same impedance corresponding to the antenna modes. Therefore, matching of the two modes can be implemented. The antenna structure may generate at least one first resonance via the first capacitor 301 and the second capacitor 302 in the first circuit 320. The antenna structure may generate at least one second resonance via the third capacitor 303 in the first circuit 320. The first resonance may correspond to the (L−½) wavelength mode of the antenna structure, and the first capacitor 301 and the second capacitor 302 may be configured to match the (L−½) wavelength mode of the antenna structure. The second resonance may correspond to an M-time wavelength mode of the antenna structure, and the third capacitor 303 may be configured to match the M-time wavelength mode of the antenna structure.

In an embodiment, an electronic component disposed between the first port 321 and the third port 323 and an electronic component disposed between the second port 322 and the fourth port 324 are symmetrical to each other. For example, the first capacitor 301 and the second capacitor 302 are symmetrical to each other, and capacitance values are the same.

In an embodiment, the first circuit 320 may further include a first inductor 304 and a second inductor 305. The first inductor 304 is connected in parallel between the first capacitor 301 and a first end of the third capacitor 303 and is grounded, and the second inductor 305 is disposed between the second capacitor 302 and a second end of the third capacitor 303 in parallel to the ground. The first inductor 304 and the second inductor 305 may be configured to adjust a resonance frequency of the (L−½) wavelength mode.

Figure 21:
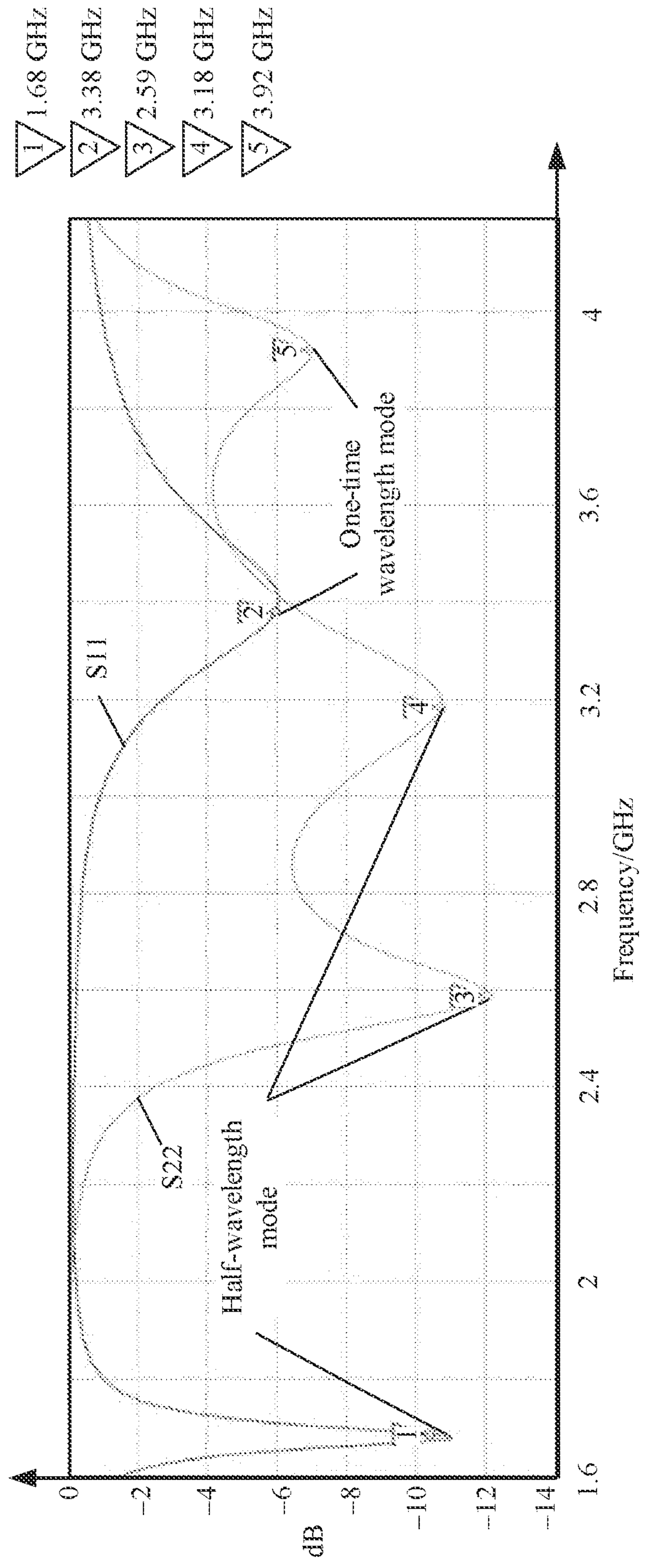
FIG. 21 is an S-parameter simulation result diagram of the antenna structure shown in FIG. 20.
Figure 22:
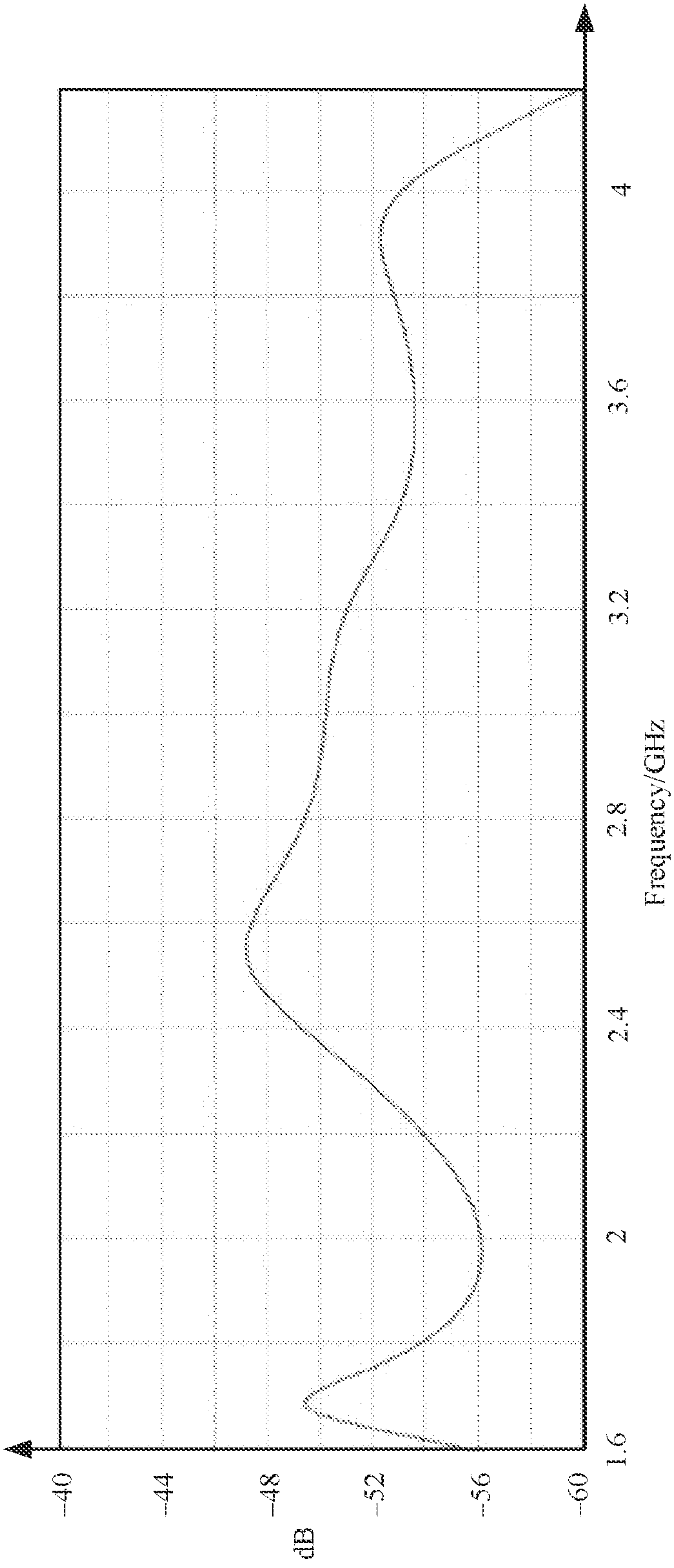
FIG. 22 is an isolation simulation result diagram of the antenna structure shown in FIG. 20.
Figure 23:
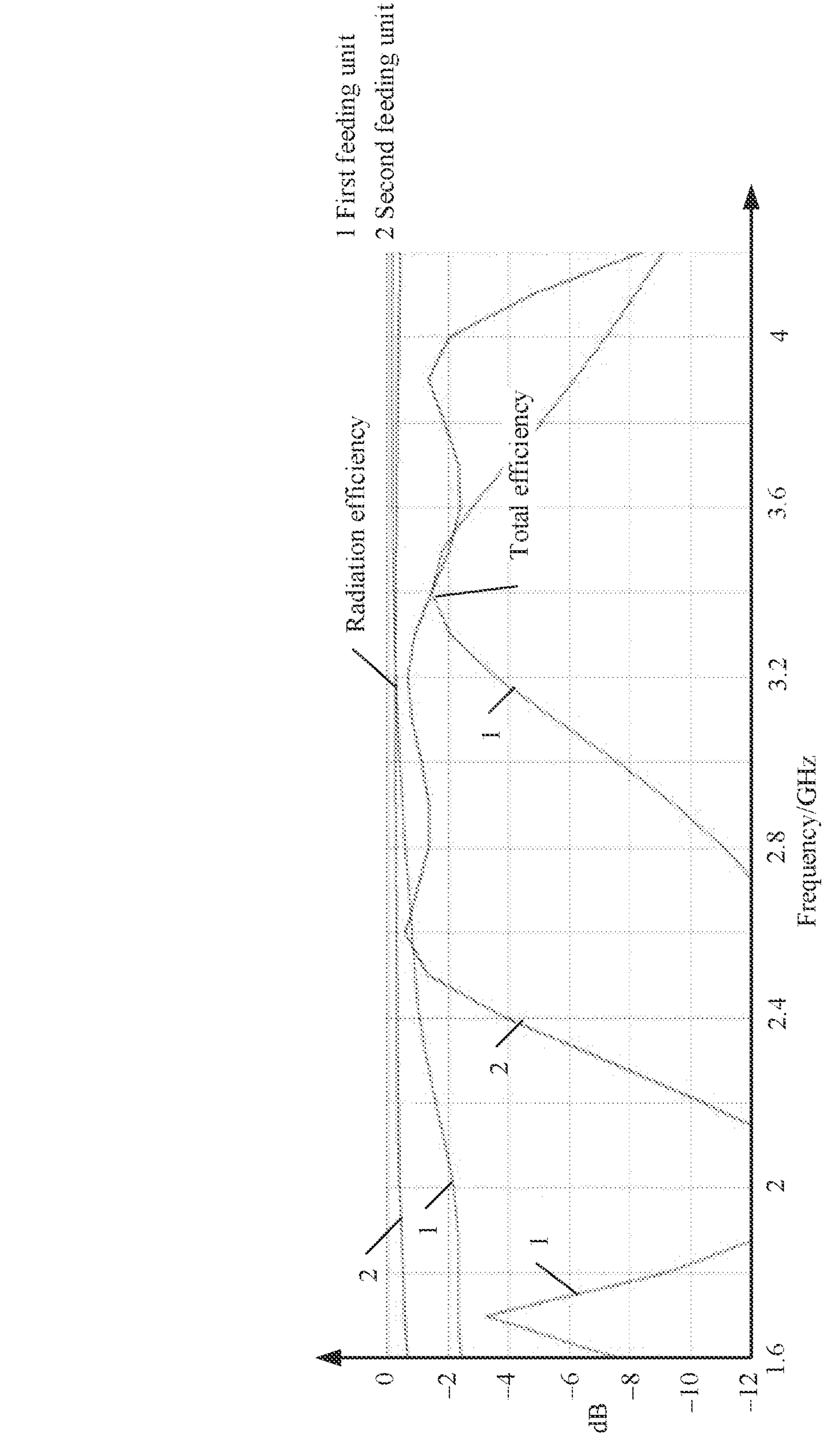
FIG. 23 is a diagram of simulation results of radiation efficiency and total efficiency of the antenna structure shown in FIG. 20.

FIG. 21 to FIG. 23 are schematic diagrams of simulation structures of the antenna structure shown in FIG. 20. FIG. 21 is an S-parameter simulation result diagram of the antenna structure shown in FIG. 20. FIG. 22 is a diagram of an isolation simulation result of the antenna structure shown in FIG. 20. FIG. 23 is a diagram of simulation results of radiation efficiency and total efficiency of the antenna structure shown in FIG. 20.

As shown in FIG. 21, when a first feeding element feeds, an S parameter corresponding to the antenna structure is S11. A half-wavelength mode and a one-time wavelength mode may be excited, and the antenna structure may operate in a plurality of resonant frequency bands. When a second feeding element feeds, the S parameter corresponding to the antenna structure is S22. The half-wavelength mode and the one-time wavelength mode may also be excited, and the antenna structure may operate in a plurality of resonant frequency bands. It should be understood that, when the second feeding element operates, because a matching network is connected, one of resonant frequency bands corresponding to the half-wavelength mode is generated by the matching network.

In an embodiment, operating frequency bands of the antenna structure may respectively cover a high frequency band in LTE, for example, 1700 MHz to 2700 MHz, an N77 (3.3 GHz to 4.2 GHz) frequency band and N79 (4.4 GHz to 5.0 GHz) frequency band in a 5G frequency band. It should be understood that parameters in the antenna structure may also be adjusted, so that the operating frequency bands cover other frequency bands. This application is merely an example, and the operating frequency bands of the antenna structure are not limited.

As shown in FIG. 22, when the operating bandwidth of the antenna structure is ensured, because the first feeding element and the second feeding element respectively excite the DM mode and the CM mode of the antenna structure, in a same frequency band, good isolation can be maintained between resonant frequency bands respectively excited by the first feeding element and the second feeding element, and a worst isolation between the two is −47 dB.

As shown in FIG. 23, in an operating frequency band corresponding to resonance generated by the antenna structure, radiation efficiency is greater than −3 dB, and total efficiency is greater than −8 dB, which may meet a communication requirement.

Figure 24:
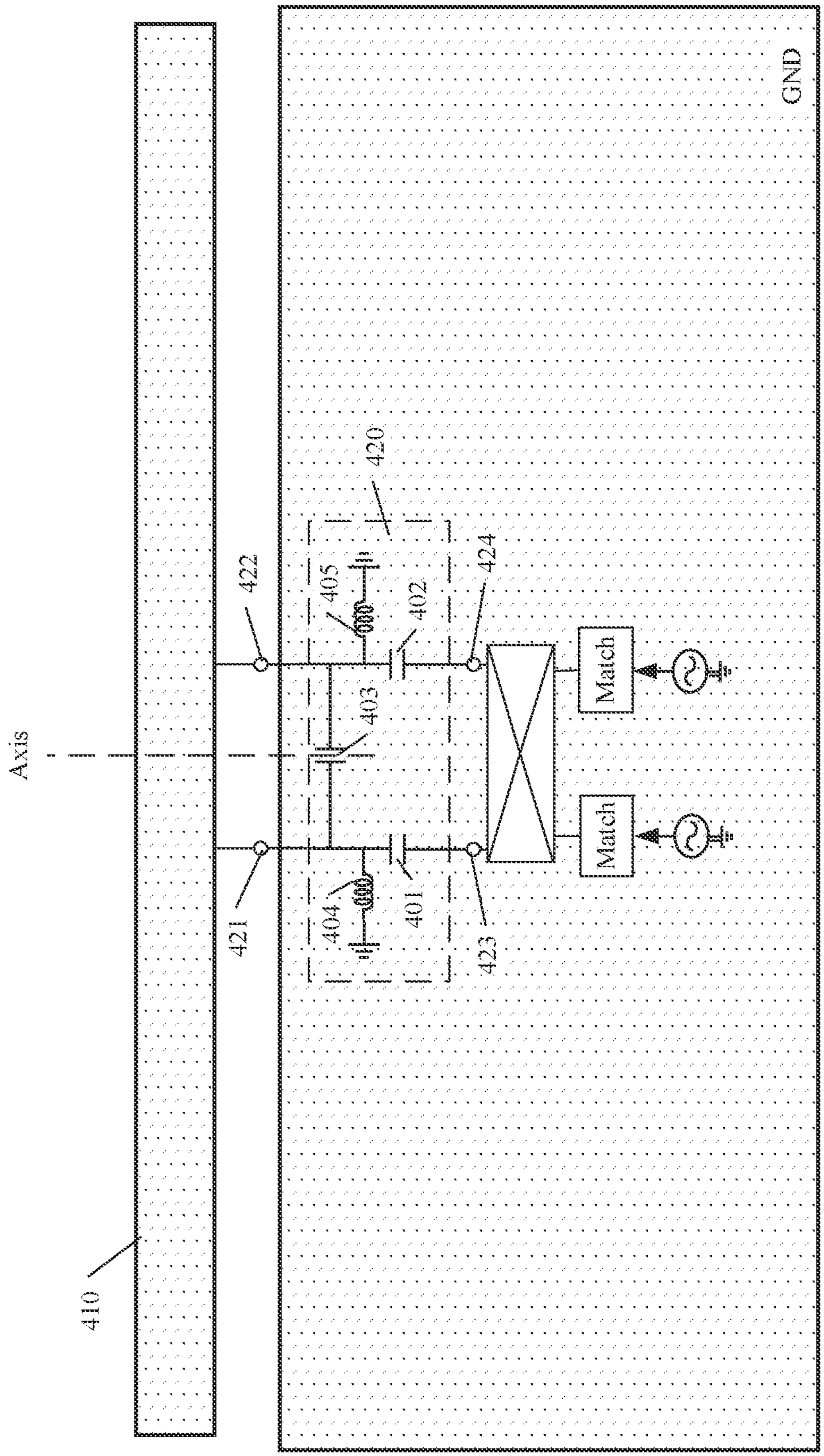
FIG. 24 is a schematic diagram of an antenna structure according to an embodiment of this application.

FIG. 24 is a schematic diagram of an antenna structure according to an embodiment of this application.

It should be understood that a first circuit provided in this embodiment of this application may be adjusted based on different antenna structures, so that the different antenna structures may excite at least one (L−½) wavelength mode and at least one M-time wavelength mode, where L and M are positive integers.

As shown in FIG. 24, the antenna structure may be a wire antenna, and an antenna radiator 410 may be a complete conductor, for example, a complete metal piece.

In an embodiment, a first circuit 420 may include a first capacitor 401, a second capacitor 402, and a third capacitor 403. The first capacitor 401 is connected in series between a first port 421 and a third port 423, and the second capacitor 402 is connected in series between a second port 422 and a fourth port 424. The first capacitor 401 and the second capacitor 402 may be configured to match an (N−½) wavelength mode of the antenna structure. A first end of the third capacitor 403 is disposed between the first capacitor 401 and the first port 421, and a second end is disposed between the second capacitor 402 and the second port 422. To be specific, the third capacitor 403 is connected in parallel between a radio frequency channel formed between the first port 421 and the third port 423 and a radio frequency channel formed between the second port 422 and the fourth port 424, and is configured to match an N-time wavelength mode of the antenna structure.

In an embodiment, an electronic component disposed between the first port 421 and the third port 423 and an electronic component disposed between the second port 422 and the fourth port 424 are symmetrical to each other. For example, the first capacitor 401 and the second capacitor 402 are symmetrical to each other, and capacitance values are the same.

It should be understood that the capacitors are connected in parallel and connected in series in the first circuit 420, and the current corresponding to the (L−½) wavelength mode and the current of the M-time wavelength mode go through different paths, to separately implement matching between the two modes. For example, a boundary condition corresponding to the (L−½) wavelength mode is the same as a boundary condition corresponding to the M-time wavelength mode, and may be respectively matched with the (L−½) wavelength mode and the M-time wavelength mode. A same boundary condition may be considered as a same impedance corresponding to the two modes. Therefore, matching of the two modes can be implemented. The antenna structure shown in FIG. 11 may generate at least one first resonance via the first capacitor 401 and the second capacitor 402 in the first circuit 420. The antenna structure shown in FIG. 11 may generate at least one second resonance via the third capacitor 403 in the first circuit 420. The first resonance may correspond to the (L−½) wavelength mode of the antenna structure, and the first capacitor 401 and the second capacitor 402 may be configured to match the (L−½) wavelength mode of the antenna structure. The second resonance may correspond to an M-time wavelength mode of the antenna structure, and the third capacitor 403 may be configured to match the M-time wavelength mode of the antenna structure.

In an embodiment, the first circuit 420 may further include a first inductor 404 and a second inductor 405. The first inductor 404 is connected in parallel between the first capacitor 401 and a first end of the third capacitor 403 and is grounded, and the second inductor 405 is disposed between the second capacitor 402 and a second end of the third capacitor 403 in parallel to the ground. The first inductor 404 and the second inductor 405 may be configured to adjust a resonance frequency of the (L−½) wavelength mode.

Figure 25:
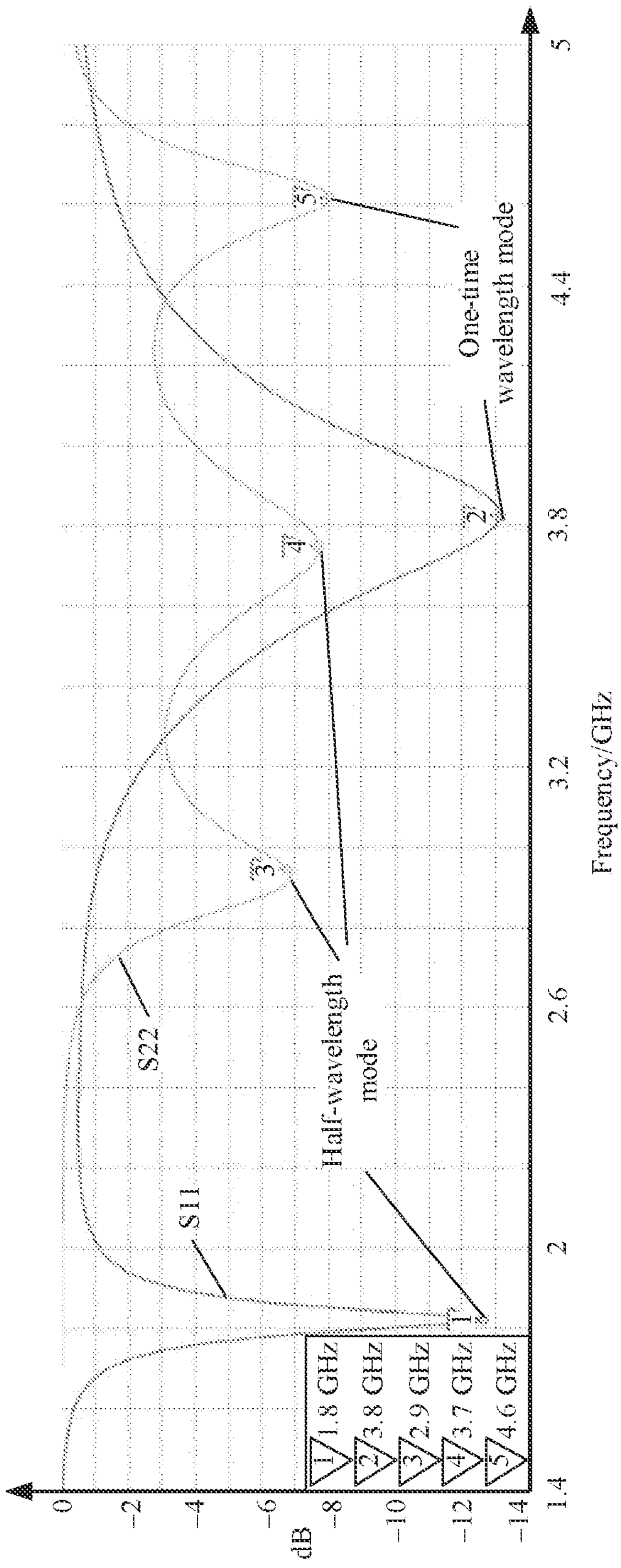
FIG. 25 is an S-parameter simulation result diagram of the antenna structure shown in FIG. 24.
Figure 26:
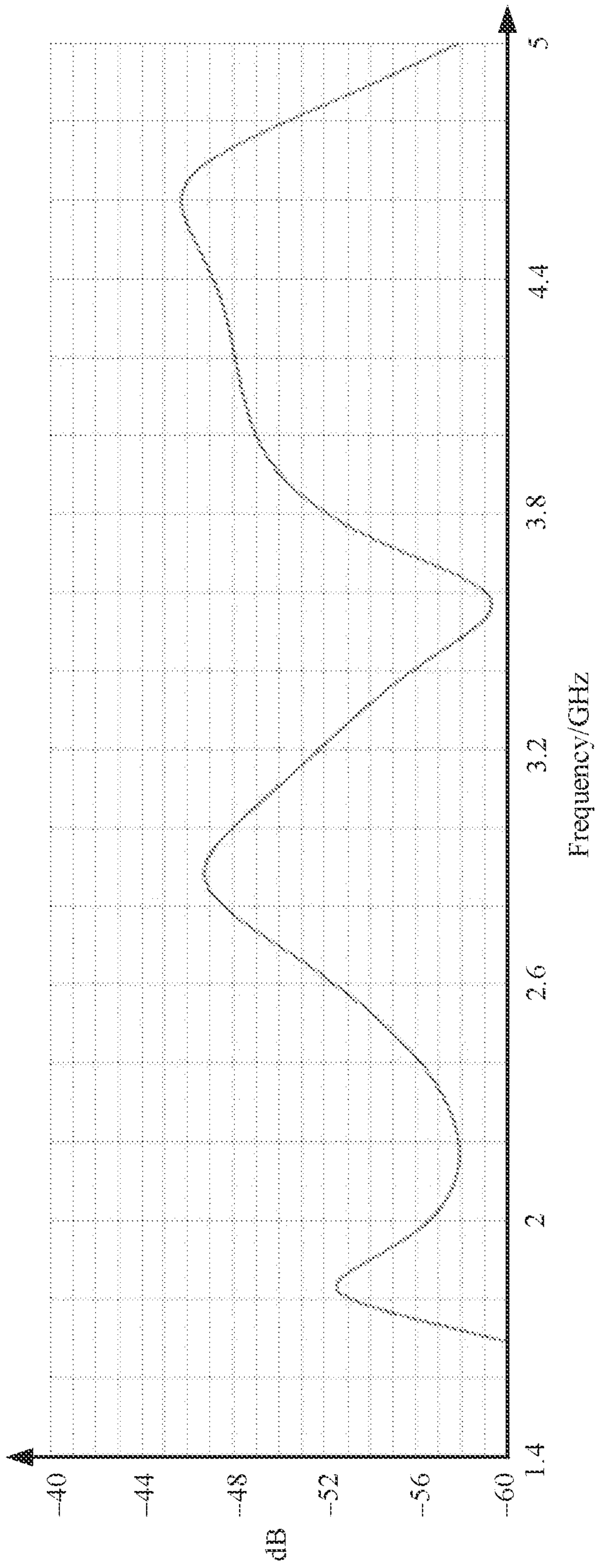
FIG. 26 is an isolation simulation result diagram of the antenna structure shown in FIG. 24.
Figure 27:
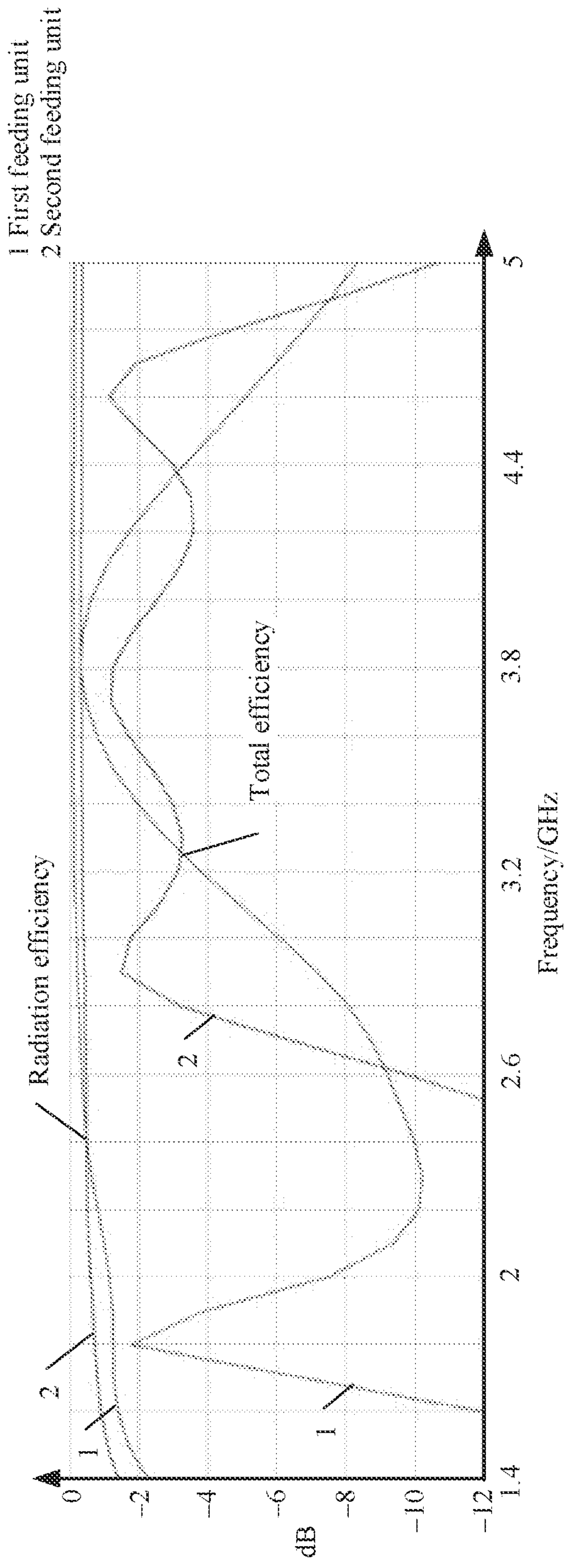
FIG. 27 is a diagram of simulation results of radiation efficiency and total efficiency of the antenna structure shown in FIG. 24.

FIG. 25 to FIG. 27 are schematic diagrams of simulation structures of the antenna structure shown in FIG. 24. FIG. 25 is an S-parameter simulation result diagram of the antenna structure shown in FIG. 24. FIG. 26 is a diagram of an isolation simulation result of the antenna structure shown in FIG. 24. FIG. 17 is a diagram of simulation results of radiation efficiency and total efficiency of the antenna structure shown in FIG. 24.

As shown in FIG. 25, when a first feeding element feeds, an S parameter corresponding to the antenna structure is S11. A half-wavelength mode and a one-time wavelength mode may be excited, and the antenna structure may operate in a plurality of resonant frequency bands. When a second feeding element feeds, the S parameter corresponding to the antenna structure is S22. The half-wavelength mode and the one-time wavelength mode may also be excited, and the antenna structure may operate in a plurality of resonant frequency bands. It should be understood that, when the second feeding element operates, because a matching network is connected, one of resonant frequency bands corresponding to the half-wavelength mode is generated by the matching network.

In an embodiment, operating frequency bands of the antenna structure may respectively cover a high frequency band in LTE, for example, 1700 MHz to 2700 MHz, an N77 (3.3 GHz to 4.2 GHz) frequency band and N79 (4.4 GHz to 5.0 GHz) frequency band in a 5G frequency band. It should be understood that parameters in the antenna structure may also be adjusted, so that the operating frequency bands cover other frequency bands. This application is merely an example, and the operating frequency bands of the antenna structure are not limited.

As shown in FIG. 26, when the operating bandwidth of the antenna structure is ensured, because the first feeding element and the second feeding element respectively excite the DM mode and the CM mode of the antenna structure, in a same frequency band, good isolation can be maintained between resonant frequency bands respectively excited by the first feeding element and the second feeding element, and a worst isolation between the two is −45.5 dB.

As shown in FIG. 27, in an operating frequency band corresponding to resonance generated by the antenna structure, radiation efficiency is greater than −2 dB, and total efficiency is greater than −8 dB, which may meet a communication requirement.

Figure 28:
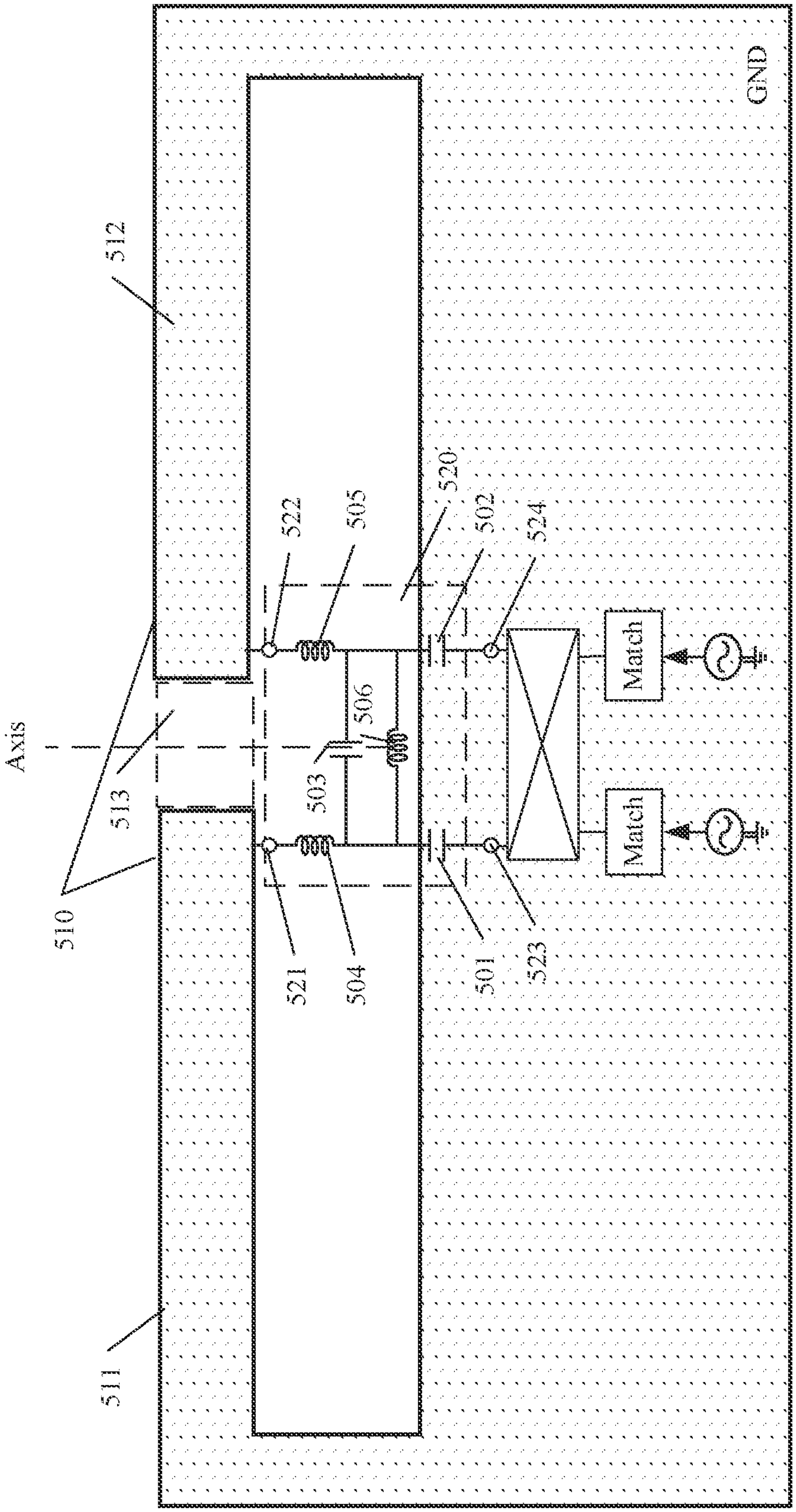
FIG. 28 is a schematic diagram of an antenna structure according to an embodiment of this application.

FIG. 28 is a schematic diagram of an antenna structure according to an embodiment of this application.

It should be understood that a first circuit provided in this embodiment of this application may be adjusted based on different antenna structures, so that the different antenna structures excite at least one (L−½) wavelength mode and at least one M-time wavelength mode, where L and M are positive integers.

As shown in FIG. 28, the antenna structure 510 may be a slot antenna whose two ends are short-circuit. The antenna radiator 510 may include a first radiator 511 and a second radiator 512. A first end of the first radiator 511 is opposite to a first end of the second radiator 512 and does not contact each other. A slot 513 is formed between the first end of the first radiator 511 and the first end of the second radiator 512, and a second end of the first radiator 511 and a second end of the second radiator 512 may be electrically connected to a ground (ground, GND) to form short-circuit. For example, the second end of the first radiator 511 is connected to the ground in a main extension direction of the first radiator 511, and/or the second end of the second radiator 512 is connected to the ground in a main extension direction of the second radiator 512. For another example, the second end of the first radiator 511 is connected to the ground in a direction (different from a main extension direction) in which the first radiator 511 is bent, and/or the second end of the second radiator 512 is connected to the ground in a direction (different from a main extension direction) in which the second radiator 512 is bent.

It should be understood that, for the slot antenna whose two ends are short-circuit, it may be considered that two ends of the radiator of the slot antenna are directly connected to the ground. For example, in an electronic device, the radiator of the slot antenna is a section of a metal frame, and short-circuit at two ends of the radiator may be considered as that the two ends of the radiator are directly connected to the metal frame respectively.

In an embodiment, a first circuit 520 may include a first capacitor 501, a second capacitor 502, and a third capacitor 503. The first capacitor 501 is connected in series between a first port 521 and a third port 523, and the second capacitor 502 is connected in series between a second port 522 and a fourth port 524. The first capacitor 501 and the second capacitor 502 may be configured to match an (N−½) wavelength mode of the antenna structure. A first end of the third capacitor 503 is disposed between the first capacitor 501 and the first port 521, and a second end is disposed between the second capacitor 502 and the second port 522. To be specific, the third capacitor 503 is connected in parallel between a radio frequency channel formed between the first port 521 and the third port 523 and a radio frequency channel formed between the second port 522 and the fourth port 524, and is configured to match an N-time wavelength mode of the antenna structure.

It should be understood that the capacitors are connected in parallel and connected in series in the first circuit 520, and the current corresponding to the (L−½) wavelength mode and the current of the M-time wavelength mode go through different paths, to separately implement matching between the two modes. For example, a boundary condition corresponding to the (L−½) wavelength mode is the same as a boundary condition corresponding to the M-time wavelength mode, and may be respectively matched with the (L−½) wavelength mode and the M-time wavelength mode. A same boundary condition may be considered as a same impedance corresponding to the two modes. Therefore, matching of the two modes can be implemented. The antenna structure shown in FIG. 11 may generate at least one first resonance via the first capacitor 501 and the second capacitor 502 in the first circuit 520. The antenna structure shown in FIG. 11 may generate at least one second resonance via the third capacitor 503 in the first circuit 520. The first resonance may correspond to the (L−½) wavelength mode of the antenna structure, and the first capacitor 501 and the second capacitor 502 may be configured to match the (L−½) wavelength mode of the antenna structure. The second resonance may correspond to an M-time wavelength mode of the antenna structure, and the third capacitor 503 may be configured to match the M-time wavelength mode of the antenna structure.

In an embodiment, an electronic component disposed between the first port 521 and the third port 523 and an electronic component disposed between the second port 522 and the fourth port 524 are symmetrical to each other. For example, the first capacitor 501 and the second capacitor 502 are symmetrical to each other, and capacitance values are the same.

In an embodiment, the first circuit 320 may further include a first inductor 504, a second inductor 505, and a third inductor 506. The first inductor 504 is connected in series between the first port 521 and a first end of the third capacitor 503, the second inductor 505 is connected in series between the second port 522 and a second end of the third capacitor 503, and the first inductor 504 and the second inductor 505 may be configured to adjust a resonance frequency of the M-time wavelength mode. A first end of the third inductor 506 is disposed between a first end of the third capacitor 503 and the first capacitor 501, and a second end of the third inductor 506 is disposed between a second end of the third capacitor 503 and the second capacitor 502. To be specific, the third inductor 506 is connected in parallel between a radio frequency channel formed between the first port 521 and the third port 523 and a radio frequency channel formed between the second port 522 and the fourth port 524, and may be configured to adjust a resonance frequency of the (L−½) wavelength mode of the antenna structure.

Figure 29:
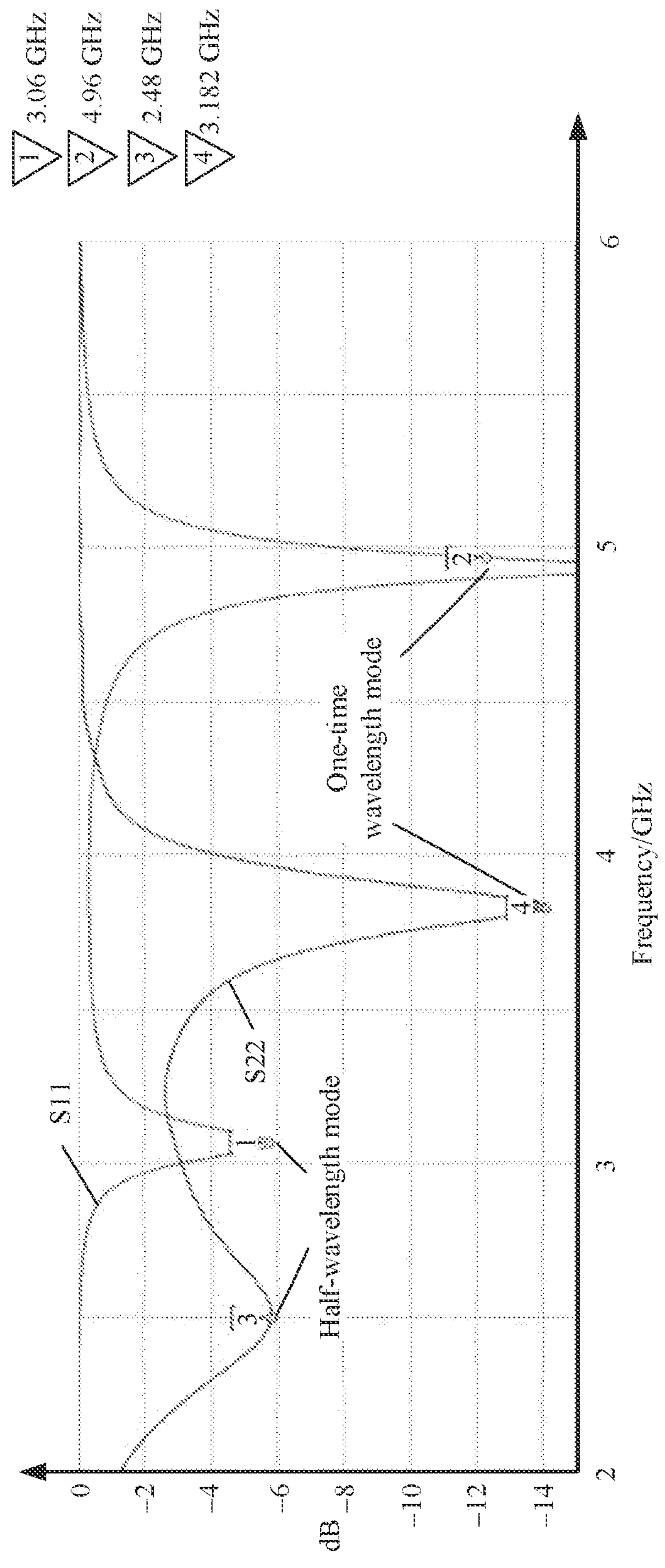
FIG. 29 is an S-parameter simulation result diagram of the antenna structure shown in FIG. 28.
Figure 30:
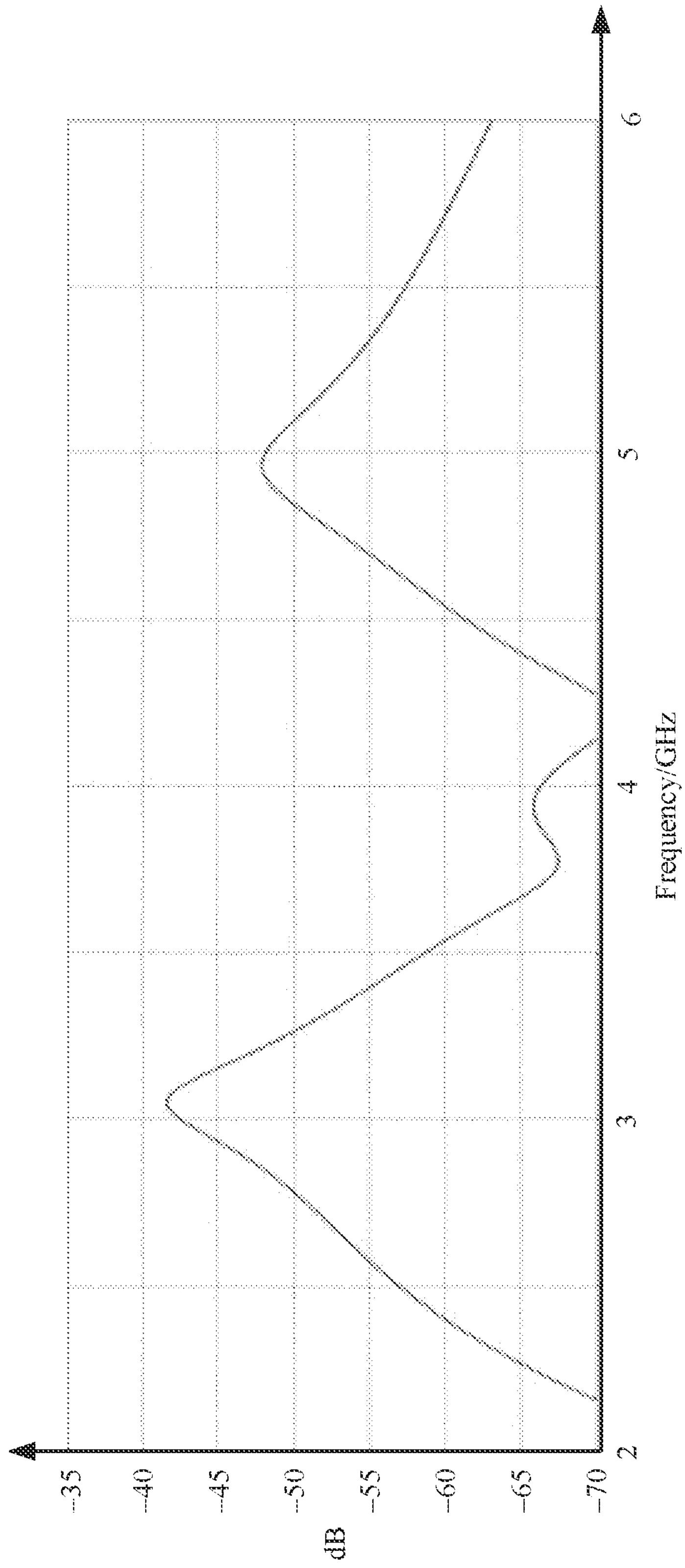
FIG. 30 is an isolation simulation result diagram of the antenna structure shown in FIG. 28.

FIG. 29 and FIG. 30 are schematic diagrams of simulation structures of the antenna structure shown in FIG. 28. FIG. 29 is an S-parameter simulation result diagram of the antenna structure shown in FIG. 28. FIG. 30 is a diagram of an isolation simulation result of the antenna structure shown in FIG. 28.

As shown in FIG. 29, when a first feeding element feeds, an S parameter corresponding to the antenna structure is S11. A half-wavelength mode and a one-time wavelength mode may be excited, and the antenna structure may operate in a plurality of resonant frequency bands. When a second feeding element feeds, the S parameter corresponding to the antenna structure is S22. The half-wavelength mode and the one-time wavelength mode may also be excited, and the antenna structure may operate in a plurality of resonant frequency bands.

In an embodiment, operating frequency bands of the antenna structure may respectively cover a high frequency band in LTE, for example, 1700 MHz to 2700 MHz, an N77 (3.3 GHz to 4.2 GHz) frequency band and N79 (4.4 GHz to 5.0 GHz) frequency band in a 5G frequency band. It should be understood that parameters in the antenna structure may also be adjusted, so that the operating frequency bands cover other frequency bands. This application is merely an example, and the operating frequency bands of the antenna structure are not limited.

As shown in FIG. 30, when the operating bandwidth of the antenna structure is ensured, because the first feeding element and the second feeding element respectively excite the DM mode and the CM mode of the antenna structure, in a same frequency band, good isolation can be maintained between resonant frequency bands respectively excited by the first feeding element and the second feeding element, and a worst isolation between the two is −42 dB.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented via some interfaces. The indirect couplings or communication connections between the apparatuses or units may be implemented in electronic, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:

an antenna structure comprising:

a first feeding element;

a second feeding element;

an antenna radiator comprising:

a first feeding point; and a second feeding point, wherein the first feeding point and the second feeding point are respectively disposed on two sides of a virtual axis of the antenna radiator, wherein the first feeding point and the second feeding point are symmetrical along the virtual axis, and wherein electrical lengths of the antenna radiator on the two sides of the virtual axis are the same;

a first circuit comprising:

a first port, wherein the first port is electrically connected to the first feeding point;

a second port, wherein the second port is electrically connected to the second feeding point, and wherein the first port and the second port are feeding output ports configured to feed processed electrical signals to the antenna radiator;

a third port; and a fourth port, wherein the first feeding element and the second feeding element are electrically connected to the third port and the fourth port, wherein the first feeding element is configured to pass a first electrical signal having a same phase on the third port and the fourth port, wherein the second feeding element is configured to pass a second electrical signal of having opposite phases on the third port and the fourth port, and wherein the third port and the fourth port are configured as input ports configured to feed input electrical signals of the first feeding element and the second feeding element;

a first electric-conductor, wherein the antenna radiator and a first end of the first electric-conductor form a first slot; and a second electric-conductor, wherein the antenna radiator and a second end of the second electric-conductor form a second slot, and wherein the first electric-conductor and the second electric-conductor are a part of a ground or both the first end and the second end are electrically connected to the ground.

2. The electronic device according to claim 1, wherein the first feeding element is configured to pass the first electrical signal through the first circuit and feed the first electrical signal into the antenna radiator via the first port and the second port of the first circuit, and wherein the second feeding element is configured to pass the second electrical signal through the first circuit and feed the second electrical signal into the antenna radiator via the first port and the second port of the first circuit.

3. The electronic device according to claim 1, wherein the antenna structure is configured to operate in at least one (L−½) wavelength mode and at least one M-time wavelength mode, where L and M are positive integers, and wherein the antenna structure is configured to pass a third electrical signal corresponding to the at least one (L−½) wavelength mode and a fourth electrical signal corresponding to the at least one M-time wavelength mode with different paths in the first circuit.

4. The electronic device according to claim 1, wherein the antenna radiator is symmetrical relative to the virtual axis.

5. The electronic device according to claim 1, wherein the antenna radiator further comprises:

a first radiator, wherein a third end of the first radiator and the first end of the first electric-conductor form the first slot; and a second radiator, wherein a fourth end of the second radiator and the second end of the second electric-conductor form the second slot, and wherein the first radiator and the second radiator are respectively disposed on the two sides of the virtual axis, wherein a fifth end of the first radiator and a sixth end of the second radiator are opposite, do not contact each other, and form a third slot.

6. The electronic device according to claim 5, wherein the first circuit further comprises:

a first inductor, wherein the first inductor is connected in series between the first port and the third port;

a second inductor, wherein the second inductor is connected in parallel between the first inductor and the first port and is grounded;

a third inductor, wherein the third inductor is connected in series between the second port and the fourth port; and a fourth inductor, wherein the fourth inductor is connected in parallel between the third inductor and the second port and is grounded.

7. The electronic device according to claim 6, wherein a first inductance value of the first inductor is the same as a second inductance value of the third inductor, and wherein a third inductance value of the second inductor is the same as a fourth inductance value of the fourth inductor.

8. The electronic device according to claim 6, wherein the antenna structure is configured to generate a first resonance via the antenna radiator, the second inductor, the fourth inductor, the first feeding element, and the second feeding element, and wherein the antenna structure is further configured to generate a second resonance via the antenna radiator, the first inductor, the third inductor, the first feeding element, and the second feeding element.

9. The electronic device according to claim 8, wherein the first resonance corresponds to an (L−½) wavelength mode of the antenna structure, wherein the second resonance corresponds to an M-time wavelength mode of the antenna structure, and wherein L and M are positive integers.

10. The electronic device according to claim 1, wherein the antenna radiator is a complete metal piece, comprising:

a third end that forms with the first end of the first electric-conductor the first slot; and a fourth end that forms with the second end of the second electric-conductor the second slot.

11. The electronic device according to claim 10, wherein the first circuit further comprises:

a first capacitor, wherein the first capacitor is connected in series between the first port and the third port;

a second capacitor, wherein the second capacitor is connected in series between the second port and the fourth port; and a third capacitor, wherein a first end of the third capacitor is disposed between the first capacitor and the first port, and a second end of the third capacitor is disposed between the second capacitor and the second port.

12. The electronic device according to claim 11, wherein respective capacitance values of the first capacitor and the second capacitor are the same.

13. The electronic device according to claim 12, wherein the antenna structure is configured to generate a first resonance via the antenna radiator, the first capacitor, the second capacitor, the first feeding element, and the second feeding element, and wherein the antenna structure is further configured to generate a second resonance via the antenna radiator, the third capacitor, the first feeding element, and the second feeding element.

14. The electronic device according to claim 13, wherein the first resonance corresponds to an (L−½) wavelength mode of the antenna structure, wherein the second resonance corresponds to an M-time wavelength mode of the antenna structure, and wherein L and M are positive integers.

15. The electronic device according to claim 1, wherein the antenna radiator is a complete metal piece, and wherein the antenna radiator is a wire antenna radiator.

16. The electronic device according to claim 1, wherein the electronic device further comprises a 180° directional coupler disposed between the first circuit, the first feeding element, and the second feeding element, wherein the 180° directional coupler is configured to enable the first electrical signal of the first feeding element to have a same phase at the third port and the fourth port, and wherein the 180° directional coupler is further configured to enable the second electrical signal of the second feeding element to have opposite phases at the third port and the fourth port of the first circuit.

17. The electronic device according to claim 16, wherein the electronic device further comprises:

a first matching network disposed between the first feeding element and the 180° directional coupler and configured to match a first impedance of the first feeding element; and a second matching network disposed between the second feeding element and the 180° directional coupler and configured to match a second impedance of the second feeding element.

18. An electronic device, comprising:

a ground; and an antenna structure comprising:

a first feeding element;

a second feeding element;

an antenna radiator comprising:

a first feeding point;

a second feeding point, wherein the first feeding point and the second feeding point are respectively disposed on two sides of a virtual axis of the antenna radiator, wherein the first feeding point and the second feeding point are symmetrical along the virtual axis, and wherein electrical lengths of the antenna radiator on the two sides of the virtual axis are the same;

a first radiator; and a second radiator, wherein the first radiator and the second radiator are respectively disposed on the two sides of the virtual axis, wherein a first end of the first radiator and a second end of the second radiator are opposite, do not contact each other, and form a first slot, wherein a third end of the first radiator is electrically connected to the ground, and wherein a fourth end of the second radiator is electrically connected to the ground; and a first circuit comprising:

a first port, wherein the first port is electrically connected to the first feeding point of the antenna radiator;

a second port, wherein the first port and the second port are feeding output ports configured to feed processed electrical signals to the antenna radiator;

a third port; and a fourth port, wherein the first feeding element and the second feeding element are electrically connected to the third port and the fourth port, wherein the first feeding element is configured to pass a first electrical signal having a same phase on the third port and the fourth port, wherein the second feeding element is configured to pass a second electrical signal of having opposite phases on the third port and the fourth port, and wherein the third port and the fourth port are configured as input ports configured to feed input electrical signals of the first feeding element and the second feeding element.

19. The electronic device according to claim 18, wherein the first feeding element is configured to pass the first electrical signal through the first circuit and feed the first electrical signal into the antenna radiator via the first port and the second port of the first circuit, and wherein the second feeding element is configured to pass the second electrical signal through the first circuit and feed the second electrical signal into the antenna radiator via the first port and the second port of the first circuit.

20. The electronic device according to claim 18, wherein the antenna structure is configured to operate in at least one (L−½) wavelength mode and at least one M-time wavelength mode, where L and M are positive integers, and wherein the antenna structure is configured to pass a third electrical signal corresponding to the at least one (L−½) wavelength mode and a fourth electrical signal corresponding to the at least one M-time wavelength mode with different paths in the first circuit.

* * * * *